(12) United States Patent
Hayashi

(10) Patent No.: US 11,675,121 B2
(45) Date of Patent: Jun. 13, 2023

(54) MULTI-CORE OPTICAL FIBER AND MULTI-CORE OPTICAL FIBER CABLE

(71) Applicant: SUMITOMO ELECTRIC INDUSTRIES, LTD., Osaka (JP)

(72) Inventor: Tetsuya Hayashi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/499,960

(22) Filed: Oct. 13, 2021

(65) Prior Publication Data

US 2022/0120962 A1 Apr. 21, 2022

(30) Foreign Application Priority Data

Oct. 16, 2020 (JP) .............................. JP2020-174958

(51) Int. Cl.
 *G02B 6/02* (2006.01)
 *G02B 6/44* (2006.01)

(52) U.S. Cl.
 CPC ..... *G02B 6/02042* (2013.01); *G02B 6/02004* (2013.01); *G02B 6/4403* (2013.01)

(58) Field of Classification Search
 CPC ............ G02B 6/02042; G02B 6/02004; G02B 6/4403

(Continued)

(56) References Cited

U.S. PATENT DOCUMENTS 9,557,476 B2 1/2017 Matsuo et al.
9,933,331 B2 4/2018 Hayashi et al.
(Continued)

FOREIGN PATENT DOCUMENTS

JP 2013-088458 A 5/2013
WO WO-2020/149158 A1 7/2020

OTHER PUBLICATIONS

Black, R. J. and Pask, C., "Developments in the theory of equivalent-step-index fibers," J. Opt. Soc. Am. A, JOSAA 1(11), 1984, pp. 1129-1131.

(Continued)

*Primary Examiner* — Jerry M Blevins
(74) *Attorney, Agent, or Firm* — Faegre Drinker Biddle & Reath LLP

(57) ABSTRACT

This MCF ensures sufficient manufacturing tolerance, is excellent in mass productivity, and is also capable of suppressing degradation of splice loss. The MCF includes four cores and a common cladding. Each core has adjacent relationships with two cores of remaining cores, an adjacent core interval $\Lambda$ is from $\Lambda_{nominal}-0.9$ μm to $\Lambda_{nominal}+0.9$ μm, a common cladding diameter is from 124 μm to 126 μm, an MFD, $\lambda_{cc}$ and $d_{coat}$ at a wavelength of 1310 nm satisfy a predetermined relationship, the MFD is from a MFD-reference-value−0.4 μm to the MFD-reference-value+0.4 μm with the MFD-reference-value of from 8.6 μm to 9.2 μm, a zero-dispersion wavelength is from a wavelength-reference-value−12 nm to the wavelength-reference-value+12 nm with the wavelength-reference-value of from 1312 nm to 1340 nm, a dispersion slope at a zero-dispersion wavelength is 0.092 ps/(nm²·km) or less, $\lambda_{cc}$ is 1260 nm or less, and a predetermined structural condition and an optical condition are satisfied.

18 Claims, 11 Drawing Sheets

(58) Field of Classification Search
USPC .......................................................... 385/126
See application file for complete search history.

(56) References Cited

U.S. PATENT DOCUMENTS

| | | | | |
|---|---|---|---|---|
| 11,327,203 | B1* | 5/2022 | Cook | ..................... G02B 1/046 |
| 2018/0120501 | A1 | 5/2018 | Sasaki et al. | |
| 2018/0284490 | A1* | 10/2018 | Hemenway | .......... B23K 1/0016 |
| 2019/0115715 | A1* | 4/2019 | Hasegawa | ............. H01S 3/0941 |
| 2020/0257040 | A1* | 8/2020 | Chen | ........................ G02B 6/42 |
| 2021/0356657 | A1* | 11/2021 | Mukasa | ............... G02B 6/0365 |

OTHER PUBLICATIONS

Matsui, Takashi et al., "Design of 125 μm cladding multi-core fiber with full-band compatibility to conventional single-mode fiber," Eur. Conf. Opt. Commun. (ECOC) 2015, Internet (URL:https://doi.org/10.1109/ECQC.2015.7341966), 2015.

Matsui, Takashi et al., "Step-index profile multi-core fibre with standard 125 μm cladding to fullband application," Eur. Conf. Opt. Commun. (ECOC) (2019), Internet (URL:https://doi.org/10.1049/cp.2019.0751), 2019.

Matsui, Takashi et al., "Zero-Dispersion Wavelength Optimized Single-Mode Multi-Core Fiber for High-Speed Gigabit Ethernet," Eur. Conf. Opt. Commun. (ECOC2017), 2017, pW.1.B.2.

* cited by examiner

MULTI-CORE OPTICAL FIBER AND MULTI-CORE OPTICAL FIBER CABLE

TECHNICAL FIELD

The present disclosure relates to a multi-core optical fiber (hereinafter, referred to as an "MCF") and a multi-core optical fiber cable (hereinafter, referred to as an "MCF cable").

The present application claims priority from Japanese Patent Application No. 2020-174958 filed on Oct. 16, 2020, which is based on the contents and all of which are incorporated herein by reference in their entirety.

BACKGROUND

Non-Patent Document 1 discloses a trench-assisted four-core fiber including four cores, and a cladding having an outer diameter of 125 μm. The depth of the trench is approximately −0.7% or less. A mode field diameter (hereinafter, referred to as an "MFD") at a wavelength of 1310 nm is 8.4 μm or more and 8.6 μm or less. The cable cutoff wavelength is 1171 nm or more and 1195 nm or less. The zero-dispersion wavelength is 1317 nm or more and 1319 nm or less. The wavelength dispersion slope at the zero-dispersion wavelength is 0.090 ps/(nm$^2$·km) or more and 0.091 ps/(nm$^2$·km) or less. In addition, the transmission loss is 0.33 dB/km or more and 0.35 dB/km or less at the wavelength of 1310 nm, and 0.19 dB/km or more and 0.21 dB/km or less at a wavelength of 1550 nm. A crosstalk (hereinafter, referred to as an "XT") between cores at a wavelength of 1625 nm is −43 dB/km.

Non-Patent Document 2 discloses a trenchless four-core fiber including four cores, and a cladding having an outer diameter of 125 μm. The MFD is 8.6 μm or more and 8.8 μm or less at the wavelength of 1310 nm, and is 9.6 μm or more and 9.8 μm or less at the wavelength of 1550 nm. The cable cutoff wavelength is 1234 nm or more and 1244 nm or less. The zero-dispersion wavelength is 1318 nm or more and 1322 nm or less. The wavelength dispersion slope at the zero-dispersion wavelength is 0.088 ps/(nm$^2$·km) or less and 0.089 ps/(nm$^2$·km) or less. A transmission loss at the wavelength of 1310 nm is 0.328 dB/km or more and 0.330 dB/km or less, a transmission loss at a wavelength of 1550 nm is 0.188 dB/km or more and 0.193 dB/km or less, and a transmission loss at the wavelength of 1625 nm is 0.233 dB/km or more and 0.245 dB/km or less. The inter-core XT on an O-band (1260 nm or more and 1360 nm or less) is −56 dB/km or less, and the inter-core XT on a C-band (1530 nm or more and 1565 nm or less) is −30 dB/km or less. Note that MFD/$\lambda_{cc}$ that has been calculated from the values in Table.1 of Non-Patent Document 2 has extremely small variations that are 6.97 or more and 7.08 or less.

Patent Document 1 discloses a trenchless four-core fiber including four cores, and a cladding having the outer diameter of 125 μm. With a value of 40 μm or more and 41.5 μm or less used as a pitch reference value, a core pitch (a distance between centers) falls within a range of a value of the pitch reference value−1 μm or more and a value of the pitch reference value+1 μm or less. $d_{coat}$ (a so-called OCT) falls within a range of 32 μm or more and 34 μm with 33 μm or less used as a basis. The V value is 2.50 or more and 2.58 or less. The MFD at the wavelength of 1310 nm is 8.0 μm or more and 8.3 μm or less. The bending loss at the wavelength of 1625 nm is 0.1 dB/100 turns or less at a bending radius 30 mm. The effective cutoff wavelength (not defined) is 1260 nm or less. The zero-dispersion wavelength is 1300 nm or more and 1324 nm or less. The XT among the four cores after transmission for 10 km at the wavelength of 1550 nm is −30 dB or less.

Patent Document 2 discloses a trenchless four-core fiber including four cores, and a cladding having an outer diameter of 125 μm, and the inter-core XT is suppressed to a certain value or less. Note that Patent Document 2 does not disclose a method necessary for suppressing the inter-core XT to the certain value or less. That is, the upper limit value of the core pitch A for suppressing the leakage loss to the coating is disclosed. However, the lower limit value of A necessary for suppressing the inter-core XT is not disclosed. In addition, A for realizing the XT of FIG. 6 of Patent Document 2 is not disclosed, either. Note that in paragraph "0026" of Patent Document 2, the upper limit value of A is defined by Formula (3) (whereas in paragraph "0028", the minimum value of A is defined by Formula (3), and the description is inconsistent).

Patent Document 1: Japanese Patent Application Laid-Open No. 2013-088458
Patent Document 2: WO 2020/149158 A
Patent Document 3: U.S. Pat. No. 9,933,331
Non-Patent Document 1: Takashi Matsui, et al., "Design of 125 μm cladding multi-core fiber with full-band compatibility to conventional single-mode fiber," Eur. Conf. Opt. Commun. (ECOC) 2015, the Internet <URL: https://doi.org/10.1109/ECOC.2015.7341966>.
Non-Patent Document 2: T. Matsui et al., "Step-index profile multi-core fibre with standard 125-μm cladding to full-band application," in Eur. Conf. Opt. Commun. (ECOC) (2019), the Internet <URL: https://doi.org/10.1049/cp.2019.0751>.
Non-Patent Document 3: R. J. Black and C. Pask, J. Opt. Soc. Am. A, JOSAA 1(11), p. 1129-1131, 1984.
Non-Patent Document 4: T. Matsui et al., in Eur. Conf. Opt. Commun. (ECOC2017), p. W.1.B.2.

SUMMARY

In order to solve the above-described problem, an MCF according to the present disclosure includes four cores extending along a central axis, and a common cladding. Each core has an adjacent relationship with two cores of remaining cores, a center-to-center interval Λ between the cores having the adjacent relationship falls within a range of a value of $\Lambda_{nominal}$−0.9 μm or more and a value of $\Lambda_{nominal}$+0.9 μm or less with a nominal value $\Lambda_{nominal}$ used as a basis, an outer diameter of the common cladding falls within a range of 124 μm or more and 126 μm or less with 125 μm used as a basis, in each core, an MFD, $\lambda_{cc}$, and $d_{coat}$ at a wavelength of 1310 nm satisfy a predetermined relationship, in each core, the MFD falls within a range of a value of an MFD reference value−0.4 μm or more and a value of the MFD reference value+0.4 μm or less with a value of 8.6 μm or more and 9.2 μm or less used as the MFD reference value, in each core, a zero-dispersion wavelength falls within a range of a value of a wavelength reference value−12 nm or more and a value of the wavelength reference value+12 nm or less with a value of 1312 nm or more and 1340 nm or less used as the wavelength reference value, in each core, a dispersion slope at the zero-dispersion wavelength is 0.092 ps/(nm$^2$·km) or less, in each core, $\lambda_{cc}$ is 1260 nm or less, and a predetermined structural condition and a predetermined optical condition are satisfied.

DETAILED DESCRIPTION

Figure 1:
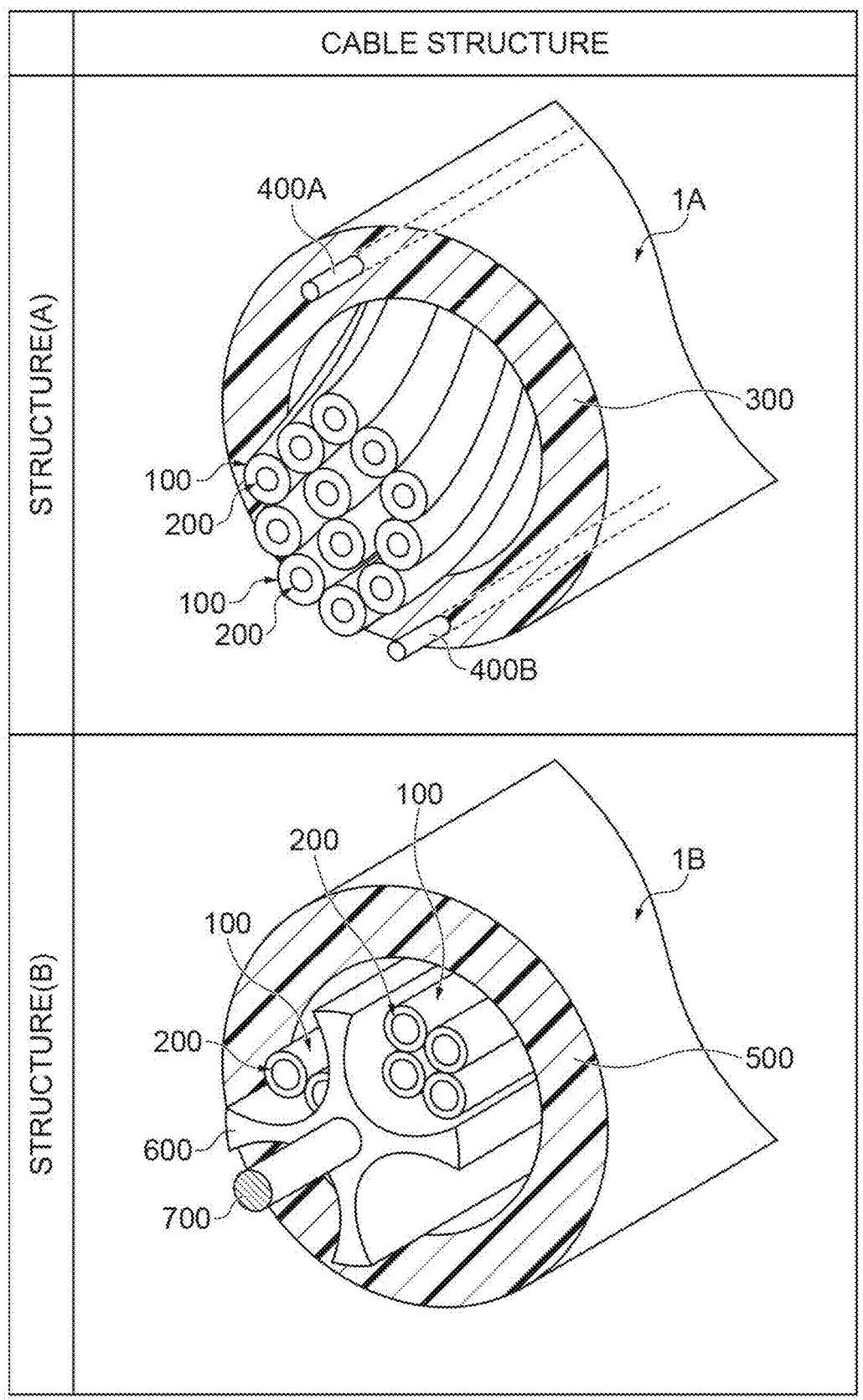
FIG. 1 is a diagram illustrating various structures of an MCF cable (including an MCF according to the present disclosure) according to the present disclosure.

Problems to be Solved by the Present Disclosure

The inventor has studied the above-described conventional techniques and found the following problems. That is, the MCF of the above Non-Patent Document 1 is significantly worse in mass productivity than a general-purpose single mode fiber (hereinafter, referred to as an "SMF"), and the manufacturing cost becomes higher. This is because it is necessary to provide a trench layer having a low refractive index that is large in relative refractive index difference with respect to the cladding around each core in order to simultaneously achieve a reduction of the inter-core XT, an increase in the number of cores, a reduction in the cladding outer diameter, and an increase in the MFD in each core.

Also with regard to the MCFs in the above Non-Patent Document 2, Patent Document 1, and Patent Document 2, the manufacturing tolerance is narrow, and the manufacturing cost increases. In a relatively short distance, an MCF usable from 1260 nm to 1625 nm is proposed. However, such an MCF is demanded to have optical characteristics in a design range that cannot be achieved without controlling a refractive index profile with very high accuracy. Therefore, the manufacturing tolerance almost the same as that of the general-purpose SMF cannot be achieved.

In addition, the presence or absence of a trench is not apparently disclosed in the above Patent Document 1, but it can be understood that a trench type is not practically included from the disclosed content (a definition of a V value and a range of the V value). Even in a short distance, improvements in the transmission characteristics other than an O-band are also attempted. As a result, the manufacturing tolerance is narrowed.

The present disclosure has been made to solve the problems as described above, and has an object to provide an MCF for short-distance transmission, by which sufficient manufacturing tolerance is ensured, mass productivity is superior, and degradation in splice loss is also suppressed.

Descriptions of Embodiments of the Present Disclosure

First, contents in embodiments of the present disclosure will be individually listed and described.

(1) According to one aspect of the present disclosure, a multi-core optical fiber (MCF) includes four cores extending along a central axis, and a common cladding covering each of the four cores. In particular, the four cores each have an adjacent relationship with two cores of remaining cores. A center-to-center interval Λ between the cores having the adjacent relationship among the four cores falls within a range of a value of $\Lambda_{nominal}$−0.9 μm or more and a value of $\Lambda_{nominal}$+0.9 μm or less with a predetermined core-interval nominal value $\Lambda_{nominal}$ used as a basis. An outer diameter of the common cladding falls within a range of 124 μm or more and 126 μm or less with 125 μm used as a basis. In each of the four cores, an MFD at a wavelength of 1310 nm, a cable cutoff wavelength $\lambda_{cc}$ measured on a 22 in length of fiber, and a shortest distance $d_{coat}$ of distances from centers of the four cores to an outer periphery of the common cladding satisfy a relationship in a following Formula (1):

$$d_{coat} \geq 2.88 \text{MFD}/\lambda_{cc}+5.36 \qquad (1).$$

Further, in each of the four cores, the MFD falls within a range of a value of an MFD reference value−0.4 μm or more and a value of the MFD reference value+0.4 μm or less with a value of 8.6 μm or more and 9.2 μm or less used as the MFD reference value. In each of the four cores, a zero-dispersion wavelength falls within a range of a value of a wavelength reference value−12 nm or more and a value of the wavelength reference value+12 nm or less with a value of 1312 nm or more and 1340 nm or less used as the wavelength reference value. In each of the four cores, a dispersion slope at the zero-dispersion wavelength is 0.092 ps/(nm²·km) or less. In each of the four cores, the cutoff wavelength $\lambda_{cc}$ is 1260 nm or less. Further, the MCF satisfies either a first condition or a second condition in the following, and satisfies either a third condition or a fourth condition in the following.

The first condition is defined that each of the four cores is in direct contact with the common cladding. The second condition relates to each of the four cores, each of the four cores further including an optical cladding provided between each the four cores and the common cladding, and is defined that a relative refractive index difference Δ2 of the optical cladding with respect to the common cladding satisfies a relationship that −0.1%≤Δ2≤0.1%.

The third condition is defined that an XT between the cores having the adjacent relationship for a fiber length of 10 km at a wavelength of 1360 nm is −10 dB or less, and in each of the four cores, MFD/$\lambda_{cc}$ and a center-to-center interval $\Lambda_a$ between the cores having the adjacent relationship satisfy any one of following Formula (2) to Formula (6):

$$7.2 \leq MFD/\lambda_{cc} \leq 8.2 \leq 0.443\Lambda_a - 5.33 \quad (2);$$

$$7.2 \leq MFD/\lambda_{cc} \leq 8.7 \leq 0.443\Lambda_a - 5.33 \quad (3);$$

$$7.2 \leq MFD/\lambda_{cc} \leq 9.2 \leq 0.443\Lambda_a - 5.33 \quad (4);$$

$$7.2 \leq MFD/\lambda_{cc} \leq 9.7 \leq 0.443\Lambda_a - 5.33 \quad (5); \text{ and}$$

$$7.2 \leq MFD/\lambda_{cc} \leq 10.2 \leq 0.443\Lambda_a - 5.33 \quad (6).$$

The fourth condition is defined that the XT between the cores having the adjacent relationship for the fiber length of 10 km at the wavelength of 1360 nm is −20 dB or less, and in each of the four cores, MFD/$\lambda_{cc}$ and the center-to-center interval $\Lambda_a$ between the cores having the adjacent relationship satisfy any one of the following Formula (7) to Formula (11):

$$7.2 \leq MFD/\lambda_{cc} \leq 8.2 \leq 0.392\Lambda_a - 4.88 \quad (7);$$

$$7.2 \leq MFD/\lambda_{cc} \leq 8.7 \leq 0.392\Lambda_a - 4.88 \quad (8);$$

$$7.2 \leq MFD/\lambda_{cc} \leq 9.2 \leq 0.392\Lambda_a - 4.88 \quad (9);$$

$$7.2 \leq MFD/\lambda_{cc} \leq 9.7 \leq 0.392\Lambda_a - 4.88 \quad (10); \text{ and}$$

$$7.2 \leq MFD/\lambda_{cc} \leq 10.2 \leq 0.392\Lambda_a - 4.88 \quad (11).$$

The MCF having the above-described structure is a four-core fiber arranged in a square and having a standard cladding diameter, and has optical characteristics suited for an O band while ensuring sufficient tolerance in mass production. In addition, the outer diameter of the common cladding falls within the range of 124 μm or more and 126 μm or less with 125 μm used as a basis. Thus, the leakage loss from the outermost peripheral core to the coating at the wavelength of 1360 nm is suppressed to 0.01 dB/km or less. Further, in a case where the MCF satisfies the above third condition, the tolerance of MFD/$\lambda_{cc}$ can also be ensured, and the total amount of the counter propagation XT to a predetermined core for the fiber length of 10 km at the wavelength of 1360 nm or less can be suppressed to −20 dB or less with a high yield at the time of fiber mass production. In a case where the MCF satisfies the above fourth condition, the tolerance of MFD/$\lambda_{cc}$ can also be ensured, and the total amount of the counter propagation XT to the predetermined core for the fiber length of 10 km at the wavelength of 1360 nm or less can be suppressed to −40 dB or less with a high yield at the time of fiber mass production. The "leakage loss" can be calculated by the method described in the above Patent Document 3, and the disclosed content thereof is incorporated herein by reference to Patent Document 3.

(2) According to one aspect of the present disclosure, the MCF includes four cores extending along a central axis, and a common cladding covering each of the four cores. The four cores each have an adjacent relationship with two cores of remaining cores. A center-to-center interval Λ between adjacent cores among the four cores falls within a range of a value of Λ nominal −0.9 μm or more and a value of Λ nominal+0.9 μm or less with a predetermined core interval nominal value Λ nominal as a basis. A diameter CD of the common cladding falls within a range of a value of $CD_{nominal}$−1 μm or more and a value of $CD_{nominal}$+1 lam or less with a predetermined cladding diameter nominal value $CD_{nominal}$ [μm] of less than 125 μm used as a basis. In each of the four cores, an MFD at a wavelength of 1310 nm and a cable cutoff wavelength $\lambda_{cc}$ measured on a 22 in length of fiber satisfy a following Formula (12):

$$d_{coat} \geq 2.88 MFD/\lambda_{cc} + 5.36 \quad (12).$$

In each of the four cores, the MFD falls within a range of a value of an MFD reference value−0.4 μm or more and a value of the MFD reference value+0.4 μm or less with a value of 8.6 μm or more and 9.2 μm or less used as the MFD reference value. The MCF according to the present disclosure preferably has a zero-dispersion wavelength that falls within a range of a value of the wavelength reference value−12 nm or more and a value of the wavelength reference value+12 nm or less, with a predetermined value uses as a wavelength reference value of 1312 nm or more and 1340 nm or less. In each of the four cores, a dispersion slope at the zero-dispersion wavelength is 0.092 ps/(nm²·km) or less. In each of the four cores, the cutoff wavelength A is 1260 nm or less. Further, the MCF satisfies either a first condition or a second condition in the following, and satisfies either a fifth condition or a sixth condition in the following.

The first condition is defined that each of the four cores is in direct contact with the common cladding. The second condition relates to each of the four cores, each of the four cores further including an optical cladding provided between each the four cores and the common cladding, and is defined that a relative refractive index difference Δ2 of the optical cladding with respect to the common cladding satisfies a relationship that −0.1%≤Δ2≤0.1%.

The fifth condition is defined that an XT between the cores having the adjacent relationship for a fiber length of 10 km at a wavelength of 1360 nm is −10 dB or less, in each of the four cores, the following Formula (13):

$$CD_{nominal} \geq 13.31 MFD/\lambda_{cc} + 24.47 \quad (13)$$

is satisfied, and in each of the four cores, MFD/$\lambda_{cc}$ and a center-to-center interval $\Lambda_a$ between the cores having the adjacent relationship satisfy any one of the following Formula (14) to Formula (18):

$$6.5 \leq MFD/\lambda_{cc} \leq 7.5 \leq 0.443\Lambda_a - 5.33 \quad (14);$$

$$6.5 \leq MFD/\lambda_{cc} \leq 8.0 \leq 0.443\Lambda_a - 5.33 \quad (15);$$

$$6.5 \leq MFD/\lambda_{cc} \leq 8.5 \leq 0.443\Lambda_a - 5.33 \quad (16);$$

$$6.5 \leq MFD/\lambda_{cc} \leq 9.0 \leq 0.443\Lambda_a - 5.33 \quad (17); \text{ and}$$

$$6.5 \leq MFD/\lambda_{cc} \leq 9.5 \leq 0.443\Lambda_a - 5.33 \quad (18).$$

The sixth condition is defined that the XT between the cores having the adjacent relationship at the wavelength of 1360 nm for the fiber length of 10 km is −20 dB or less, in each of the four cores, the following Formula (19):

$$CD_{nominal} \geq 9.37 MFD/\lambda_{cc} + 31.73 \quad (19)$$

is satisfied,
and in each of the four cores, $MFD/\lambda_{cc}$ and the center-to-center interval $\Lambda_a$ between the cores having the adjacent relationship satisfy any one of the following Formula (20) to Formula (24):

$$6.5 \leq MFD/\lambda_{cc} \leq 7.5 \leq 0.392\Lambda_a - 4.88 \quad (20);$$

$$6.5 \leq MFD/\lambda_{cc} \leq 8.0 \leq 0.392\Lambda_a - 4.88 \quad (21);$$

$$6.5 \leq MFD/\lambda_{cc} \leq 8.5 \leq 0.392\Lambda_a - 4.88 \quad (22);$$

$$6.5 \leq MFD/\lambda_{cc} \leq 9.0 \leq 0.392\Lambda_a - 4.88 \quad (23); \text{ and}$$

$$6.5 \leq MFD/\lambda_{cc} \leq 9.5 \leq 0.392\Lambda_a - 4.88 \quad (24).$$

The MCF having the above-described structure is a four-core fiber arranged in a square and having a standard cladding diameter, and has optical characteristics suited for an O band while ensuring sufficient tolerance in mass production. The relationship between the MFD and $\lambda_{cc}$ ($MFD/\lambda_{cc}$) satisfies the above Formulas (12) and (13), and thus the leakage loss to the coating of the outermost peripheral core at the wavelength of 1360 nm can be suppressed to 0.01 dB/km or less. In addition, in a case where the MCF satisfies the above fifth condition, the tolerance of $MFD/\lambda_{cc}$ can also be ensured, and the total amount of the counter propagation XT to a predetermined core for the fiber length of 10 km at the wavelength of 1360 nm or less can be suppressed to −20 dB or less with a high yield at the time of fiber mass production. Furthermore, in a case where the MCF satisfies the above sixth condition, the tolerance of $MFD/\lambda_{cc}$ can also be ensured, and the total amount of the counter propagation XT to the predetermined core for the fiber length of 10 km at the wavelength of 1360 nm or less can be suppressed to −40 dB or less with a high yield at the time of fiber mass production. By allowing degradation of the optical characteristics on a C band (1530 nm or more and 1565 nm or less) and an L band (1565 nm or more and 1625 nm or less), which are long wavelength bands, it becomes possible to realize a wide tolerance in the MCF having optical characteristics suited for the O band. Tolerance of $MFD/\lambda_{cc}$ can also be ensured. In addition, the total amount of the counter propagation XT to a predetermined core for a fiber length of 10 km at the wavelength of 1360 nm or less can be suppressed to −40 dB or less, while maintaining a high yield at the time of fiber mass production.

(3) According to one aspect of the present disclosure, the MCF may further include a coating surrounding the common cladding and comprised of, for example, a resin. In such a configuration, preferably, a leakage loss from at least any of the four cores to the coating at a wavelength of 1550 nm or a wavelength of 1625 nm is 0.05 dB/km or more, a transmission loss of at least one of the four cores at the wavelength of 1550 nm is 0.25 dB/km or more, or a transmission loss at the wavelength of 1625 nm is 0.25 dB/km or more. In this case, by allowing degradation of the optical characteristics on the C band (1530 nm or more and 1565 nm or less) and the L band (1565 nm or more and 1625 nm or less), which are long wavelength bands, it becomes possible to realize a wide tolerance in the MCF having optical characteristics suited for the O band.

(4) According to one aspect of the present disclosure, in the MCF, either the above third condition or the above fifth condition is satisfied, and the XT between the cores having the adjacent relationship at the wavelength of 1550 nm for the fiber length of 10 km is preferably −10 dB or more. Alternatively, in the MCF, either the above fourth condition or the above sixth condition is satisfied, and the XT between the cores having the adjacent relationship at the wavelength of 1550 nm for the fiber length of 10 km is preferably −20 dB or more. In this case, by allowing degradation of the optical characteristics on the C band and the L band, which are long wavelength bands, it becomes possible to realize a wide tolerance in the MCF having optical characteristics suited for the O band.

(5) An MCF cable according to the present disclosure preferably includes a plurality of MCFs including the MCF having the above-described structure. In addition, according to one aspect of the present disclosure, an MCF ribbon, in which a plurality of MCFs including the MCF having the above-described structure are intermittently bonded, may be incorporated. According to one aspect of the present disclosure, the MCF cable incorporates an MCF ribbon with spirally twisted. According to any aspect, an increase in transmission capacity is enabled. In addition, according to one aspect of the present disclosure, the MCF cable preferably includes a multi-core optical fiber having an average bending radius of 0.03 in or more and 0.14 in or less, or 0.14 in or more and 0.3 in or less in a fiber longitudinal direction. In this case, the degradation of the optical characteristics associated with an increase in bending loss can be effectively suppressed.

Heretofore, each aspect listed in the section of [Descriptions of Embodiments of the Present Disclosure] is applicable to each of all the remaining aspects or to all combinations of these remaining aspects.

Details of Embodiments of the Present Disclosure

Hereinafter, specific structures of a multi-core optical fiber (MCF) and a multi-core optical fiber cable (MCF cable) according to the present disclosure will be described in detail with reference to the accompanying drawings. Note that the present disclosure is not limited to these examples, but is indicated by the claims, and is intended to include all modifications within the meaning and scope equivalent to the claims. In addition, in the description of the drawings, the same elements are denoted by the same reference numerals, and duplicated descriptions will be omitted.

FIG. 1 is a diagram illustrating various structures of an MCF cable (including an MCF according to the present disclosure) according to the present disclosure.

An MCF cable 1A having a structure (A) includes an outer sheath 300 including an MCF accommodation space extending in a longitudinal direction of the MCF cable 1A, and a plurality of MCFs 100 (MCFs according to the present disclosure). In the outer sheath 300, two tensile strength lines (tension members) 400A and 400B extending along the MCF accommodation space are embedded. The MCFs 100 each includes a glass fiber 200, the outer periphery surface of which is covered with a resin coating. Note that the MCF 100 can constitute an intermittently bonded MCF ribbon, and in this case, the MCF ribbon is incorporated into the MCF cable 1A with spirally twisted.

On the other hand, an MCF cable 1B having a structure (B) includes an outer sheath 500 including an MCF accommodation space extending in a longitudinal direction of the MCF cable 1B, a slotted core 600 that divides the MCF accommodation space into a plurality of spaces, and a plurality of MCFs 100 (MCFs according to the present disclosure). The slotted core 600 that divides the MCF accommodation space into the plurality of spaces is accommodated inside the outer sheath 500. A tensile strength line 700 extending in a longitudinal direction of the MCF cable 1B is embedded in the slotted core 600. The plurality of MCFs 100 are accommodated in any one of the spaces divided by the slotted core 600.

Figure 2:
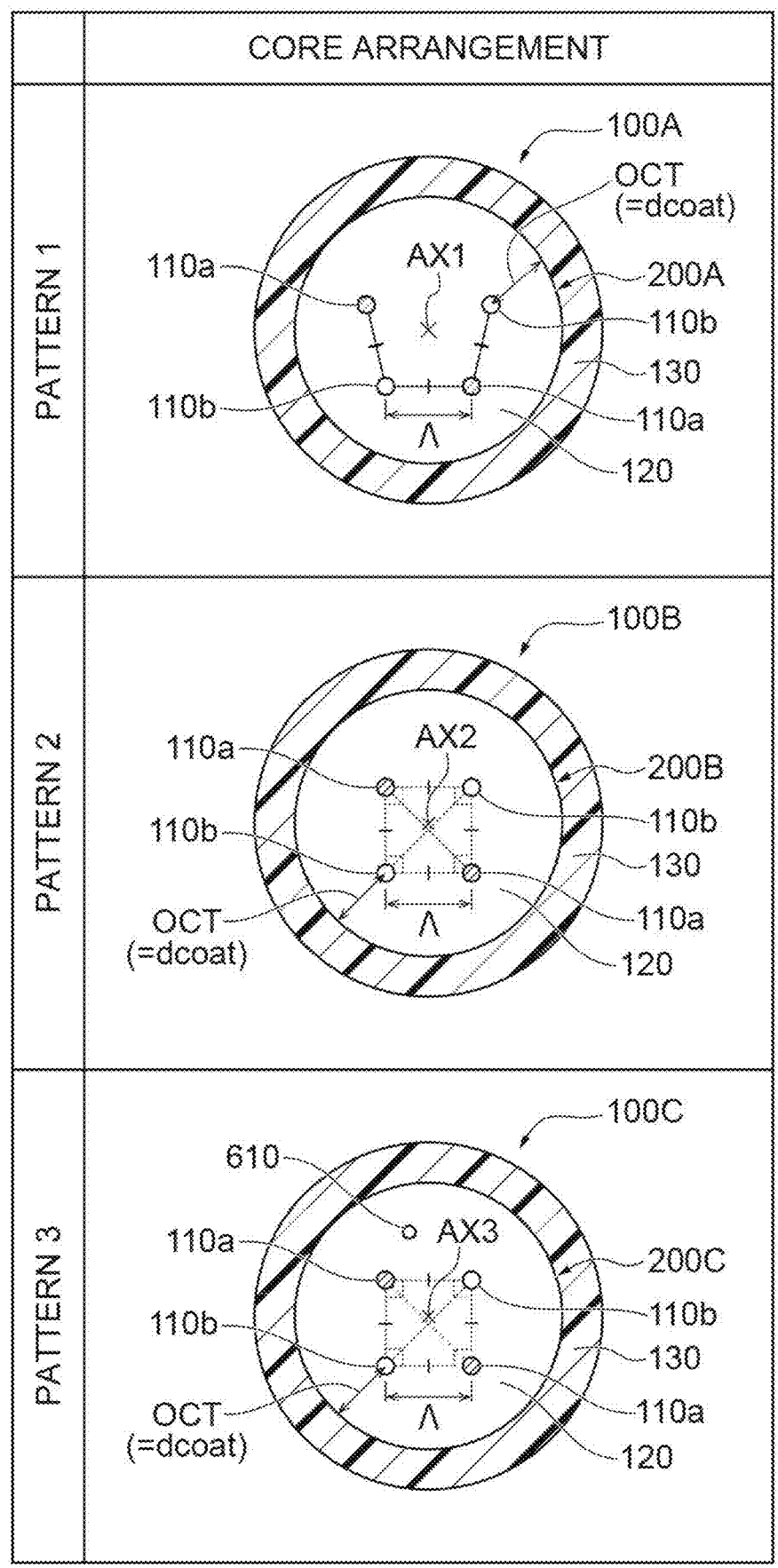
FIG. 2 is a diagram illustrating various core arrangements in the MCF according to the present disclosure.

FIG. 2 is a diagram illustrating various core arrangements in the MCF according to the present disclosure. In particular, a top part of FIG. 2 illustrates a cross-sectional view of a four-core MCF 100A (an MCF 100 according to the present disclosure) in which four cores are arranged to form a 3-sides equal trapezoid, a middle part of FIG. 2 illustrates a cross-sectional view of a four-core MCF 100B (an MCF 100 according to the present disclosure) in which four cores are respectively arranged at square lattice points set at positions shifted from a cladding center, and a bottom part of FIG. 2 illustrates a cross-sectional view of a four-core MCF 100C (an MCF 100 according to the present disclosure) in which a marker is additionally provided in the core arrangement of the middle part. Note that each drawing of FIG. 2 illustrates, as an example, a combination of first cores 100a that propagate light in a predetermined direction and second cores 100b that propagate the light in an opposite direction.

In the MCF 100 according to the present disclosure, preferably, the core arrangement including the four cores does not have rotational symmetry twice or more with the cladding center used as a symmetry axis. In this case, even without a marker, core symmetry is enabled at the time of splicing or at the time of MCF rotation alignment. In this situation, the respective centers of the four cores are preferably arranged to be line symmetric with respect to a straight line as a symmetry axis that passes through the cladding center. Accordingly, at the time of splicing another MCF to the MCF, the core alignment is enabled without the polarity at either end face of the MCF.

The four-core MCF 100A illustrated in the top part of FIG. 2 includes a glass fiber 200A, and a resin coating 130 for covering the glass fiber 200A. The glass fiber 200A includes four cores (in this example, the first cores 100a and the second cores 100b are included), and a common cladding 120 surrounding the four cores. On a cross-section of the four-core MCF 100A, the four cores are respectively allocated to four vertexes of a 3-sides equal trapezoid, in which three sides have an equal length $\Lambda_{nominal}$ and the length of the remaining one side is sufficiently longer than $\Lambda_{nominal}$ (a pattern 1 of a core arrangement). In this case, four cores are arranged to surround the cladding center (a fiber axis AX1). Note that the center position of each the first cores 100a and the second cores 100b is disposed within 1.0 μm, preferably within 0.5 μm, and more preferably within 0.25 μm from the allocated vertex of the 3-sides equal trapezoid. The length of the remaining one side of the above 3-sides equal trapezoid is preferably 1.2 times or more of $\Lambda_{nominal}$. Accordingly, the rotational symmetry twice or more can be sufficiently lost at the time of end surface observation, while the inter-core XT is suppressed to a predetermined value or less. In addition, $d_{coat}$ of any core preferably falls within a range of a value of $d_{coat,nominal}-1$ μm or more and a value of $d_{coat,nominal}+1$ μm or less with a predetermined $d_{coat,nominal}$ used as a basis. In this case, the rotational symmetry twice or more can be sufficiently lost at the time of end surface observation, while the leakage loss to the coating is suppressed to a predetermined value or less.

Note that, in the example illustrated in the top part of FIG. 2, a structure serving as a marker does not have to be provided other than the cores. In a case where the structure serving as the marker is provided other than the cores, manufacturing performance is degraded in order to realize the structure (for example, in a case of a manufacturing method for forming a hole in a cladding preform to insert a core preform, it is necessary to additionally form a hole for a marker to insert a marker preform, serving as a marker having a refractive index different from that of the cladding, into the hole). The absence of the structure serving as the marker other than the cores enables an improvement in the manufacturing performance of the MCF, in the example illustrated in the top part of FIG. 2.

The four-core MCF 100B illustrated in the middle part of FIG. 2 includes a glass fiber 200B, and a resin coating 130 for covering the glass fiber 200B. The glass fiber 200B includes four cores (in this example, the first cores 100a and the second cores 100b are included), and the common cladding 120 surrounding the four cores. On a cross-section of the four-core MCF 100B, the four cores each have a predetermined lattice point interval $\Lambda_{nominal}$, and are respectively allocated to lattice points of a square lattice having four lattice point pairs each having an adjacent relationship. The middle part of FIG. 2 illustrates, as an example of the core arrangement, an example (a pattern 2 of the core arrangement) in which the center of the square lattice is shifted from the cladding center (coincides with a fiber axis AX2). However, the center of the square lattice may coincide with the cladding center. In this case, $d_{coat}$ of the respective cores are equal to each other, and thus the optical characteristics can be made uniform. The center positions of the four cores are each disposed within 1.0 μm, preferably within 0.5 μm, and more preferably within 0.25 μm from the allocated lattice point of the square lattice. Accordingly, in a case where the four square lattice points are set as the design positions for the core center, it becomes possible to suppress a deviation of the core arrangement, while allowing the dimensional tolerance of the core arrangement. In addition, as compared with the core arrangement in the four-core MCF 100A illustrated in the top part, it can be expected that the uniformity of the residual stress and the like in the cross-section applied to the four cores is improved, and the optical characteristics of the four cores also become uniform. Note that in the example of the middle part, the four cores are approximately arranged in a square lattice shape, and the center-to-center interval $\Lambda$ between the cores having an adjacent relationship falls within a range of a value of $\Lambda_{nominal}-2.0$ μm or more and a value of $\Lambda_{nominal}+2.0$ μm or less, preferably a range of a value of $\Lambda_{nominal}-1.0$ μm or more and a value of $\Lambda_{nominal}+1.0$ μm or less, and more preferably a range of a value of $\Lambda_{nominal}-0.5$ μm or more and a value of $\Lambda_{nominal}+0.5$ μm or less.

The four-core MCF 100C illustrated in the bottom part of FIG. 2 includes a glass fiber 200C, and a resin coating 130 for covering the glass fiber 200C. The glass fiber 200C includes four cores (in this example, the first cores 100a and the second cores 100b are included), and the common cladding 120 surrounding the four cores. The bottom part of FIG. 2 illustrates, as an example of the core arrangement, on a cross-section of the four-core MCF 100C, an example in which the center of the square lattice is shifted from the cladding center (a fiber axis AX3) in a core arrangement constituted of the four cores, in a similar manner to the core arrangement in the four-core MCF 100B illustrated in the middle part. The four-core MCF 100B and the four-core MCF 100C are different in that a marker 610 is provided (in a pattern 3 of the core arrangement). Note that, also in the example in which the marker 610 is provided in this manner, the center of the square lattice may coincide with the cladding center. In this case, $d_{coat}$ of the respective cores are equal to each other, and thus the optical characteristics can be made uniform. The refractive index of the marker 610 is preferably different from the refractive index of the common cladding 120.

Figure 3:
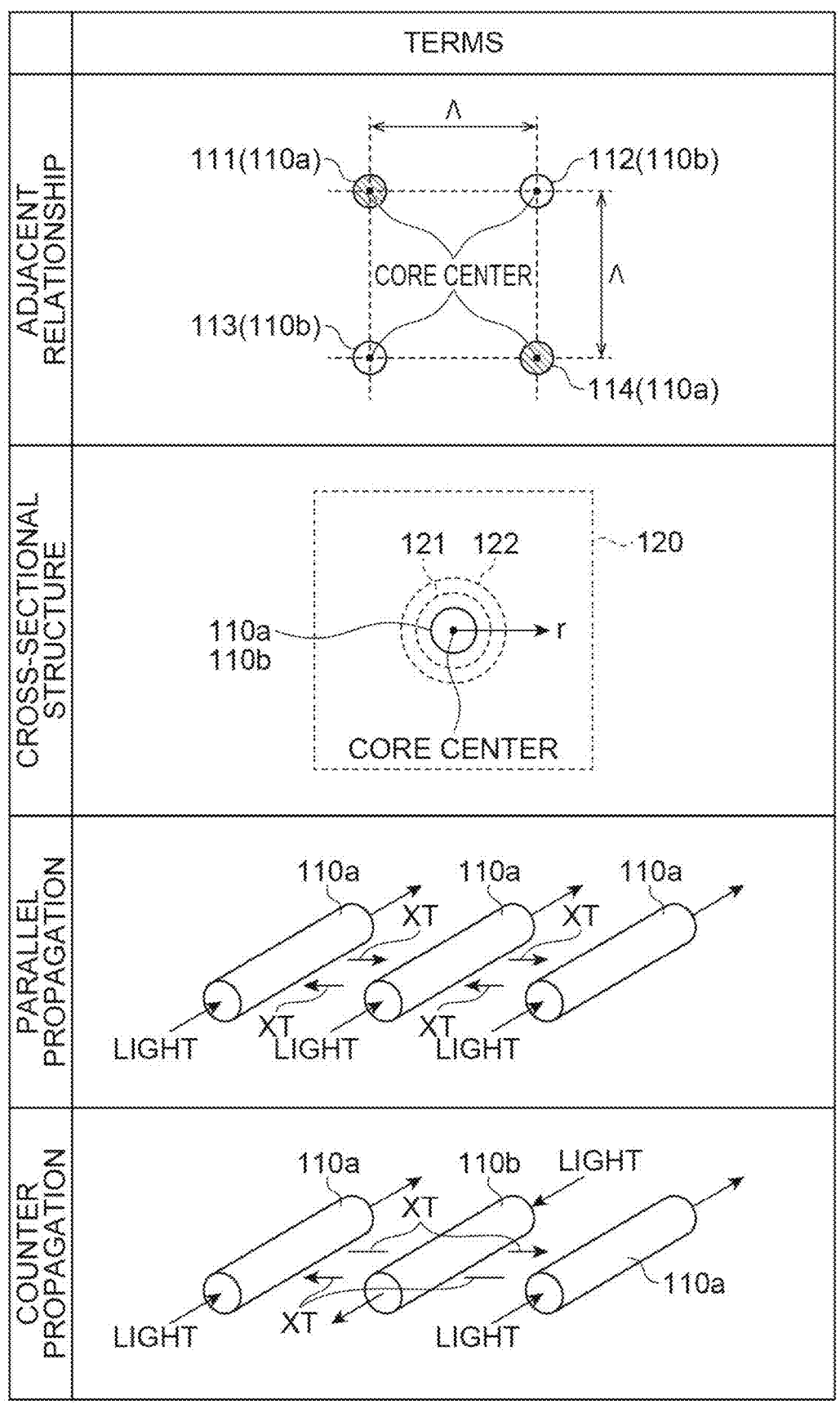
FIG. 3 is a diagram for describing main terms used in the present specification.

FIG. 3 is a diagram for describing main terms (adjacent relationship, cross-sectional structure around cores, parallel propagation and parallel propagation XT (crosstalk), and counter propagation and counter propagation XT (crosstalk)) used in the present specification.

(Adjacent Relationship)

In the present specification, regarding an adjacent relationship between the cores, in focusing on one specific core of the four cores arranged on the cross-section of the MCF, a core having a minimum center-to-center interval with respect to such one specific core and a core having difference between a center-to-center interval and the minimum center-to-center interval of 2 μm or less is defined as a core having an adjacent relationship with such one specific core. That is, as illustrated in FIG. 3, in a case where a core 111 (110a) is set as a specific core, a core 112 (110b) and a core 113 (110b) are the cores each having an adjacent relationship with the core 111. Note that the cores are arranged to constitute the square lattice in both the pattern 2 and the pattern 3 of FIG. 2. Therefore, the adjacent relationship is not established between the core 112 (110b) and the core 113 (110b) as illustrated in FIG. 3. However, a core 114 (110a) has an adjacent relationship with both the core 112 (110b) and the core 113 (110b).

(Cross-Sectional Structure Around Cores)

In the four cores having the core arrangements of the patterns 1 to 3 illustrated in FIG. 2, according to the present disclosure, in the cross-sectional structure around each core (the first core 110a or the second core 110b), the common cladding 120 surrounds the outer periphery of the first core 110a or the second core 110b. The common cladding 120 may be provided to be in direct contact with the first core 110a or the second core 110b. However, an optical cladding 121 may be provided between the common cladding 120 and the first core 110a or the second core 110b. In addition, a trench layer 122 having a small relative refractive index difference Δ3 may be provided between the optical cladding 121 and the common cladding 120. Note that the optical cladding 121 is prepared for each core, and has a relative refractive index difference Δ2 of −0.1% or more and 0.1% or less with respect to the refractive index of the common cladding 120. Further, in a case where a trench layer 122 is provided, the trench layer 122 preferably has a relative refractive index difference Δ3 of −0.4% or more and less than 0% with respect to the refractive index of the common cladding.

(Parallel Propagation and Parallel Propagation XT)

In the example illustrated in FIG. 3, three cores (the first cores 110a each propagating light in an identical direction) in which adjacent relationships are established are illustrated. That is, the adjacent relationship is established between the left core and the center core, and the adjacent relationship is established between the center core and the right core. That is, a state in which the cores each having the adjacent relationship propagate light in the identical direction is referred to as "parallel propagation". In this case, a general inter-core XT (parallel propagation XT) is generated between the adjacent cores (between the cores having an adjacent relationship) that propagate light in the identical direction.

(Counter Propagation and Counter Propagation XT)

On the other hand, in counter propagation, light is propagated in directions different from each other between two cores in which the adjacent relationship is established. That is, in the example of FIG. 3, the adjacent relationship is established between the left core and the center core. However, the left core functions as the first core 110a, and the center core functions as the second core 110b that propagates light in a direction different from that of the first core 110a. The general XT generated between the left core and the center core hardly affects the communication quality. In a similar manner, the right core having the adjacent relationship with the center core functions as the first core 110a, and the general XT generated between the right core and the center core hardly affects the communication quality. In this manner, a state in which the cores having the adjacent relationship propagate light in different directions from each other is referred to as "counter propagation". However, between the left core and the right core (both of which function as the first cores 110a), the XT affects the communication quality via the center core (which functions as the second core 110b). In this manner, the inter-core XT that propagates the light in the identical direction via the core that establishes the adjacent relationship and that propagates the light in the opposite direction is referred to as "counter propagation XT".

Note that in the following description, a description will be given with reference to examples of "parallel propagation" and "counter propagation" illustrated in FIG. 3. However, in a case where $XT_{co}(L1)$ represents an XT (parallel propagation XT: $XT_{co}$) between the cores between which the adjacent relationship is established (hereinafter, referred to as an "adjacent core") at a fiber length L1, and the XT is represented in decibel value, the XT can be expressed in the following Formula (25):

$$XT_{co}(L2) = XT_{co}(L1) + 10\log_{10}\frac{L2}{L1}, \qquad (25)$$

and is increased by 10 dB at a distance of 10 times.

In a case where the XT is represented in decibel value, for example, in the example of the counter propagation illustrated in FIG. 3, the XT (the counter propagation XT: $XT_{counter}$) from the right core to the left core via the center core can be expressed in the following Formula (26):

$$XT_{counter}=2XT_{co}-10\log_{10}2 \qquad (26)$$

using the parallel propagation XT: $XT_{co}$ between the left core and the center core and between the center core and the right core.

In a case where $XT_{counter}(L1)$ represents a counter propagation XT at the fiber length L1, and XT is expressed in decibel value, the counter propagation XT at a fiber length L2 can be expressed in the following Formula (27):

$$XT_{counter}(L2) = XT_{counter}(L1) + 20\log_{10}\frac{L2}{L1}, \quad (27)$$

and is increased by 20 dB at a distance of 10 times.

A total $XT_{co,tot}$ of $XT_{co}$ from an adjacent core to a predetermined core is calculated in the following Formula (28):

$$X_{co,tot} = XT_{co} + 10\log_{10}N \quad (28),$$

where N represents the number of adjacent cores to the predetermined core.

The total $XT_{counter,tot}$ of $XT_{counter}$ from a specific core having an adjacent relationship with an adjacent core of the predetermined core (but, having no adjacent relationship with the predetermined core) to the predetermined core seems to be calculated by the following Formula (29):

$$XT_{counter,tot} = XT_{counter} + 10\log_{10}M = 2XT_{co} - 10\log_{10}2 + 10\log_{10}M \quad (29),$$

where M represents the number of the specific cores to the predetermined core.

However, the fact is different, and the inventor has discovered that in a case where Kn represents the number of adjacent cores (including the predetermined core) of an adjacent core n of the predetermined core, the total $XT_{counter,tot}$ satisfies the following Formula (30):

$$XT_{counter,tot} = XT_{counter} + 10\log_{10}\sum_{n=1}^{N}(K_n - 1) = \\ 2XT_{co} - 10\log_{10}2 + 10\log_{10}\sum_{n=1}^{N}(K_n - 1). \quad (30)$$

Thus, in the four-core MCF having a core arrangement in which the four cores are arranged on a square lattice (hereinafter, referred to as a "square core arrangement"), $XT_{counter,tot}$ to any core is expressed in the following Formula (31):

$$XT_{counter,tot} = XT_{counter} + 10\log_{10}2 = 2XT_{co} \quad (31).$$

Therefore, in the four-core fiber in which there are only three core pairs each having an adjacent relationship (such as 1×4 core arrangement in which four cores are arranged in one line), $XT_{counter,tot}$ to any core having two adjacent cores can be expressed in the following Formula (32):

$$XT_{counter,tot} = XT_{counter} + 10\log_{10}1 = 2XT_{co} - 10\log_{10}2 \quad (32).$$

As described above, in order to set $XT_{counter,tot}$ [dB] after the propagation for 10 km in the four-core MCF having the square core arrangement to −20 dB or less, the parallel propagation XT ($XT_{co}$) between the adjacent cores in terms of the fiber length L [km] is preferably expressed in the following Formula (33):

$$XT_{co}(L) \leq -10.0 + 10\log_{10}\frac{L}{10}. \quad (33)$$

The sum of the parallel propagation XT from two adjacent cores to any core is expressed in the following Formula (34):

$$XT_{co,tot}(L) \leq -7.0 + 10\log_{10}\frac{L}{10}. \quad (34)$$

In order to set $XT_{counter,tot}$ [dB] after the propagation for 10 km in the four-core MCF having the square core arrangement to −40 dB or less, the parallel propagation XT ($XT_{co}$) between the adjacent cores in terms of the fiber length L [km] is preferably expressed in the following Formula (35):

$$XT_{co}(L) \leq -20.0 + 10\log_{10}\frac{L}{10}. \quad (35)$$

The sum of the parallel propagation XT from two adjacent cores to any core is preferably expressed in the following Formula (36):

$$XT_{co,tot}(L) \leq -17.0 + 10\log_{10}\frac{L}{10}. \quad (36)$$

In order to set $XT_{counter,tot}$ [dB] after the propagation for 10 km to −20 dB or less in the four-core MCF in which there are only three core pairs each having an adjacent relationship (such as 1×4 core arrangement in which four cores are arranged in one line), the parallel propagation XT ($XT_{co}$) between adjacent cores in terms of the fiber length L [km] is preferably expressed in the following Formula (37):

$$XT_{co}(L) \leq -8.5 + 10\log_{10}\frac{L}{10}. \quad (37)$$

The sum of the parallel propagation XT from such adjacent cores to any core having two adjacent cores is expressed in the following Formula (38):

$$XT_{co,tot}(L) \leq -5.5 + 10\log_{10}\frac{L}{10}. \quad (38)$$

In order to set $XT_{counter,tot}$ [dB] after the propagation for 10 km in the four-core MCF having the square core arrangement to −40 dB or less, the parallel propagation XT ($XT_{co}$) between the adjacent cores in terms of the fiber length L [km] is preferably expressed in the following Formula (39):

$$XT_{co}(L) \leq -18.5 + 10\log_{10}\frac{L}{10}. \quad (39)$$

The sum of the parallel propagation XT from the adjacent cores to any core having two adjacent cores is preferably expressed in the following Formula (40):

$$XT_{co,tot}(L) \leq -15.5 + 10\log_{10}\frac{L}{10}. \quad (40)$$

Figure 4:
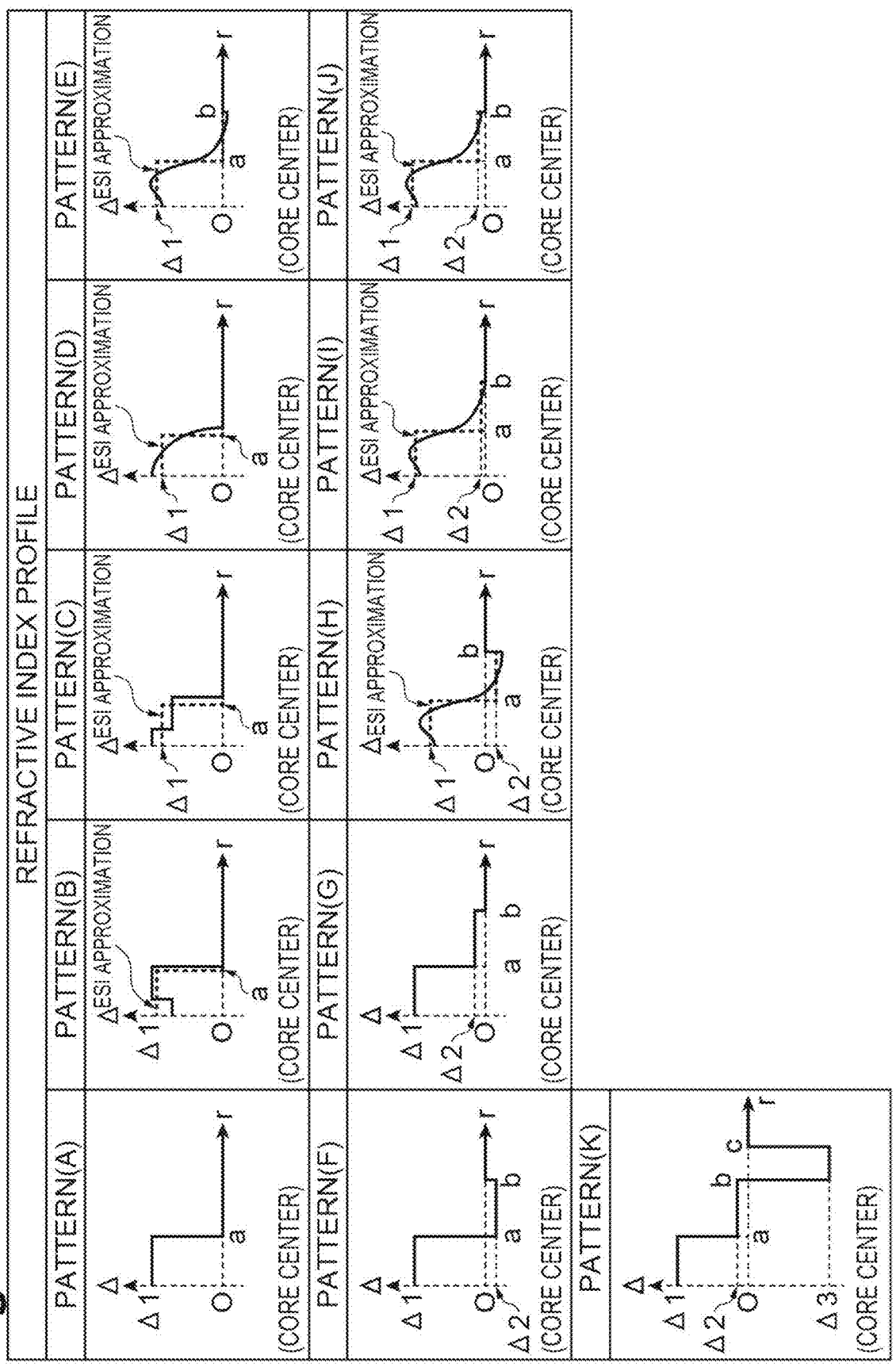
FIG. 4 is a diagram illustrating a refractive index profile around each core applicable to the MCFs according to the present disclosure.

Next, a profile structure applicable to the MCFs according to the present disclosure will be described. FIG. 4 is a diagram illustrating a refractive index profile around each core applicable to the MCFs according to the present disclosure. Note that unless otherwise specified, a "relative refractive index difference Δ" means a relative refractive index difference with respect to the refractive index of the common cladding (and therefore, is not the relative refractive index difference with respect to the refractive index of pure silica glass).

Regarding the core structure in the MCF according to the present disclosure, an appropriate structure is selectable for the refractive index profile of the core and the optical characteristics associated with the profile in accordance with the use application. For example, refractive index profiles of a pattern (A) to a pattern (K) illustrated in FIG. 4 are applicable. Note that in FIG. 4, Δ represents a relative refractive index difference with the refractive index of the common cladding used as a basis, r represents a radius vector (radius) from each core center, and a local coordinate system in which each core center and Δ=0%, is set to an origin O is illustrated. Structures may be the same or different between the cores.

The pattern (A) illustrated in FIG. 4 is a step type refractive index profile, the pattern (B) is a ring type refractive index profile, the pattern (C) is a double step type refractive index profile, the pattern (D) is a graded type refractive index profile, and the pattern (E) is a fringe type refractive index profile. These are applicable to the core structure in the MCF according to the present disclosure. Further, the pattern (F) and the pattern (H) in which a Depressed type refractive index profile is provided around the core, the pattern (G), the pattern (I), and the pattern (J) in which a Raised type refractive index profile is provided around the core, and the pattern (E) in which a Matched type refractive index profile is provided around the core are also applicable to the core structure.

For the refractive index profiles other than the step type refractive index profile of the pattern (A), a core radius a and Δ (Δ1) of the core of a case of being approximated by the step type by using an equivalent-step-index (ESI) approximation are obtainable (the above-described Non-Patent Document 3).

The above-described Non-Patent Document 3 is easily applicable to a case where the boundary between the core and the cladding is clear. However, it is difficult to apply the above-described Non-Patent Document 3 to a case where the boundary between the core and the cladding (the common cladding 120 or the optical cladding 121) is unclear as the fringe type refractive index profile of the pattern (E). For example, in a case where the method of the above-described Non-Patent Document 3 is applied without change with b in the pattern (E) regarded as the radius of the core, the ESI approximation does not work well. In such a case, it is preferable to apply the above-described Non-Patent Document 3 with r that takes 2/5Δ of Δ at r, in which a slope (∂Δ/∂r) of the refractive index profile takes a negative value having a largest absolute value, and which is regarded as the core radius a. In this situation, regarding the refractive index of the cladding (the common cladding 120 or the optical cladding 121), by using r that is a value obtained from a simple average of Δ in a range from a to b expressed in the following Formula (41):

$$\Delta 2 \approx \int_a^b \Delta dr \quad (41)$$

or a weighted average with r represented in the following Formula (42):

$$\Delta 2 \approx \int_a^b \Delta r dr \Big/ \int_a^b r dr, \quad (42)$$

a and Δ1 (a maximum relative refractive index difference between the first core 110a and the second core 110b) can be obtained by the calculation based on the above Non-Patent Document 3. Δ2 (a relative refractive index difference of the optical cladding 121) is preferably −0.10% or more and 0.10% or less. This is because the manufacturing performance is largely improved.

The trench layer 122 having a refractive index lower than those of the optical cladding 121 and the common cladding 120 may be provided around the optical cladding 121 (the pattern (K) in FIG. 4). However, in a case where a relative refractive index difference Δ3 of the trench layer 122 with the refractive index of the common cladding 120 used as a basis is −0.5% or less, the manufacturing performance is largely degraded. Therefore, Δ3≥−0.4% is preferable, Δ3≥−0.3% is more preferable, and Δ3≥−0.2% is further preferable. Note that from the viewpoint of the manufacturing performance, the absence of the trench layer is more preferable.

Regarding the material of the core and the cladding (the optical cladding 121 or the common cladding 120), glass containing silica glass as a main component is preferable, because a low transmission loss and high mechanical reliability are achievable. By adding Ge to the core, a refractive index difference generated between the core and the cladding is preferable. Alternatively, by adding F to the cladding, a refractive index difference generated between the core and the cladding is preferable. By adding a minute amount of F to the core and the optical cladding, a Depressed type profile is achievable with good manufacturing performance, and is preferable. Cl may be added to the core or the cladding. This enables suppression of an OH group and suppression of an absorption loss caused by the OH group. A minute amount of P may be contained in the core or the cladding. This enables an enhancement in manufacturing performance in a part of a glass synthesis process.

The MCF according to the present disclosure having the cross-sectional structure illustrated in FIG. 2 includes the resin coating 130. The diameter of the resin coating 130 preferably falls within a range of 235 μm or more and 265 μm or less with 250 μm used as a basis. Accordingly, the MCF according to the present disclosure formed into a cable is enabled without making a significant change to existing cabling facilities or the like.

In a typical general-purpose SMF, the nominal value $CD_{nominal}$ of the cladding diameter is 125 μm, and the nominal value of the coating diameter is approximately 245 μm or more and 250 μm or less. However, the coating diameter is preferably 160 μm or more and 230 μm or less, because the number of accommodated optical fibers per unit cross-section in a cable can be increased.

The MCF according to the present disclosure is a four-core MCF as described above. The number of the cores is an even number, and is a power of 2. Therefore, it is desirable to use as the number of spatial channels for communication.

Further, in the MCF according to the present disclosure, the arrangement of the centers of the four cores (substantially the core arrangement) is line symmetric with respect to a straight line as a symmetry axis that passes through the cladding center. However, preferably, there is no rotational symmetry more than once. Accordingly, even without a marker, core symmetry is enabled at the time of fiber splicing or at the time MCF rotation alignment. In this situation, the centers of the above-described four cores are preferably arranged to be line symmetric with respect to a straight line as a symmetry axis that passes through the cladding center. Accordingly, at the time of splicing the MCF to another MCF, the core alignment is enabled without the polarity at either end face of the MCF.

For example, in the example illustrated in the top part of FIG. 2, also in the MCF, on the cross-section, the cores are respectively allocated at four vertexes of the 3-sides equal trapezoid in which three sides each have an equal length $\Lambda_{nominal}$ and the remaining one side has a length sufficiently longer than $\Lambda_{nominal}$. In this situation, preferably, the center position of each core is disposed within 1.0 µm, preferably within 0.5 µm, and more preferably within 0.25 µm from the corresponding vertex of the 3-sides equal trapezoid. The length of the above-described remaining one side of the 3-sides equal trapezoid is preferably 1.2 times or more of $\Lambda_{nominal}$. Accordingly, the rotational symmetry twice or more can be sufficiently lost at the time of end surface observation, while the inter-core XT is suppressed to a predetermined value or less.

In addition, preferably, $d_{coat}$ of any core falls within a range of a value of $d_{coat,nominal}-1$ µm or more and a value of $d_{coat,nominal}+1$ µm or less with a predetermined nominal value $d_{coat,nominal}$ used as a basis. Accordingly, the rotational symmetry twice or more can be sufficiently lost at the time of end surface observation, while the leakage loss to the coating is suppressed to a predetermined value or less.

The MCF according to the present disclosure preferably has no structure serving as a marker other than the cores. This is because the provision of the structure serving as the marker other than the cores degrades the manufacturing performance in order to realize the structure. For example, in the case of the manufacturing method for forming the hole in the cladding preform to insert the core preform, it is necessary to additionally form the hole for the marker and insert the marker preform (the preform serving as the marker) having a refractive index different from that of the cladding, into the hole. Conversely, the absence of the structure serving as the marker other than the cores enables an improvement in the manufacturing performance of the MCF according to the present disclosure.

In addition, as illustrated in the MCF in the middle part of FIG. 2 according to the present disclosure, the core arrangement in which there are four core pairs each having an adjacent relationship in the four cores, that is, a square lattice arrangement may be employed. Note that in this case, the center position of the square lattice is shifted from the cladding center in order to sufficiently lose the rotational symmetry twice or more about the cladding center. The centers of the four cores are respectively arranged within 1.0 µm, preferably within 0.5 µm, and more preferably within 0.25 µm from the four lattice points of the square lattice each having a predetermined lattice point interval $\Lambda_{nominal}$. Accordingly, in a case where the four lattice points of the square lattice are set as the design positions of the core center, it becomes possible to suppress shifting of the core arrangement, while allowing the dimensional tolerance of the core arrangement. In addition, as compared with the core arrangement of the 3-sides equal trapezoid illustrated in the top part of FIG. 2, the four-core arrangement in a square lattice shape is desirable, because the residual stress and the like in the cross-section applied to the four cores become uniform, and the optical characteristics of the four cores also become uniform. Note that, in the above-described configuration, it can be rephrased that four cores are approximately arranged in a square lattice shape, and the center-to-center interval $\Lambda$ between the adjacent cores falls within a range of a value of $\Lambda_{nominal}$ 2.0 µm or more and a value of $\Lambda_{nominal}+$ 2.0 µm or less, preferably a range of a value of $\Lambda_{nominal}-1.0$ µm or more and a value of $\Lambda_{nominal}+1.0$ µm or less, and more preferably a range of a value of $\Lambda_{nominal}-0.5$ µm or more and a value of $\Lambda_{nominal}+0.5$ µm or less.

Note that in the MCF according to the present disclosure, a configuration in which the marker is arranged like the example illustrated in the bottom part of FIG. 2 is not excluded. In summary of the above conditions, there are three to four core pairs each having an adjacent core relationship among the four cores, the center positions of the four cores are arranged to be line symmetric with respect to a straight line as a symmetry axis that passes through the cladding center and that does not pass through the center of any core. Further, in a case where there are only three core pairs each having an adjacent core relationship, preferably, the arrangement of the core center with the cladding center as the symmetry axis does not have the rotational symmetry twice or more.

In addition, the MCF cable according to the present disclosure preferably includes a plurality of MCFs including the MCF having the above-described structure. As an example, the MCF cable may incorporate an MCF ribbon in which a plurality of MCFs including the MCF having the above-described structure are intermittently bonded. In the MCF cable, the MCF ribbon is incorporated with spirally twisted. Any of the configurations enables an increase in transmission capacity. Furthermore, the MCF cable preferably includes a multi-core optical fiber having an average bending radius of 0.03 in or more and 0.14 in or less, or 0.14 in or more and 0.3 in or less in a fiber longitudinal direction. In this case, the degradation of the optical characteristics associated with an increase in bending loss can be effectively suppressed.

Each core in the MCF according to the present disclosure preferably includes an MFD that falls within a range of a value of the MFD reference value−0.4 µm or more and a value of the MFD reference value+0.4 µm or less, with a value of 8.6 µm or more and 9.2 µm or less at a wavelength of 1310 nm used as an MFD reference value. In this case, among the general-purpose SMFs regulated in ITU-T G652, in particular, as compared with a splice loss between the general-purpose SMFs of a type in which the nominal value of the MFD $MFD_{nominal}$ is small ($MFD_{nominal}\approx 8.6$ µm) and a bending loss is suppressed, a splice loss caused by an axis deviation between the MCFs according to the present disclosure (in a case where a predetermined axis deviation is given) can be made equal or less.

Each core in the MCF according to the present disclosure preferably includes an MFD that falls within a range of 8.2 µm or more and 9.0 µm or less with 8.6 µm used as a basis at the wavelength of 1310 nm. Accordingly, among the general-purpose SMFs regulated in ITU-T G652, regarding the splice between a general-purpose SMF of a type in which the nominal value of the MFD is small and the bending loss is suppressed and the MCF according to the present disclosure, a splice loss caused by a core central axis deviation (an axis deviation) (in a case where a predetermined axis deviation is given) can be made equal.

The MCF according to the present disclosure preferably has a zero-dispersion wavelength of 1300 nm or more and 1324 nm or less. Accordingly, a distortion of the signal waveform after transmission on an O-band can be suppressed to an extent same as that of the general-purpose SMF.

The MCF according to the present disclosure preferably has a zero-dispersion wavelength that falls within a range of a value of the wavelength reference value−12 nm or more and a value of the wavelength reference value+12 nm or less, with a predetermined value uses as a wavelength reference value of 1312 nm or more and 1340 nm or less. Accordingly, a distortion of the signal waveform after transmission on the O-band can be suppressed more than that of the general-purpose SMF (see the above-described Non-Patent Document 4).

In the MCF according to the present disclosure, on the used wavelength band, the total sum of the XT from an adjacent core to any core is preferably −20 dB or less, even after the propagation for 10 km. The XT from the core other than the adjacent cores is sufficiently low and can be ignored. Therefore, a sufficient signal-to-noise ratio is achievable even in a case where a coherent wave is detected. In addition, in the MCF according to the present disclosure, on the used wavelength band, the total sum of the XT from an adjacent core to any core is preferably −40 dB or less, even after the propagation for 10 km. The XT from the core other than the adjacent cores is sufficiently low and can be ignored. Therefore, a sufficient signal-to-noise ratio is achievable even in a case where an intensity modulation wave is directly detected. In the MCF according to the present disclosure, on the used wavelength band, the parallel propagation XT is preferably −10.0 dB or less, even after the propagation for 10 km. Accordingly, the counter propagation XT can be reduced to −20 dB or less even after the propagation for 10 km. Furthermore, in the MCF according to the present disclosure, on the used wavelength band, the parallel propagation XT is preferably −20.0 dB or less, even after the XT parallel propagation for 10 km. Accordingly, the counter propagation XT can be reduced to −40 dB or less, even after the propagation for 10 km.

In the following description, a description will be given with regard to studied results about an MCF including cores having the refractive index profiles of the pattern (E), the pattern (H), and the pattern (J) of FIG. 4, and having a of 3 μm or more and 5 μm or less, Δ1−Δ2 of 0.3% or more and 0.6% or less, Δ2 of −0.1% or more and 0.1% or less, and b/a of 2 or more and 5 or less.

The core structure having a predetermined zero-dispersion wavelength and the MFD can be designed by those skilled in the art by calculating an electric field distribution in a fundamental mode and a wavelength dependency of an effective refractive index using a finite element method or the like. For example, in ranges of 3 μm≤a≤5 μm and 0.3%≤(Δ1−Δ2)≤0.6%, the relationship between a and (Δ1−Δ2) to be a zero-dispersion wavelength $\lambda_0$ [μm], is expressed in the following Formula (43):

$$a \approx 0.0667(\lambda_0 - 1343.1)(\Delta1-\Delta2)^2 + 0.0900(\lambda_0 - 1354.6)(\Delta1-\Delta2) - 0.0517(\lambda_0 - 1411.2) \quad (43).$$

Therefore, in order for the zero-dispersion wavelength $\lambda_0$ [μm] to fall within the range of a value of $\lambda_{0nominal}$−12 nm or more and a value of $\lambda_{0nominal}$+12 nm or less, the relationship between a and (Δ1−Δ2) preferably satisfies both the following Formulas (44) and (45):

$$a \leq 0.0667(\lambda_{nominal} - 12 - 1343.1)(\Delta1-\Delta2)^2 + 0.0900(\lambda_{nominal} - 12 - 1354.6)(\Delta1-\Delta2) - 0.0517(\lambda_{nominal} - 12 - 1411.2) \quad (44); \text{ and}$$

$$a \geq 0.0667(\lambda_{nominal} + 12 - 1343.1)(\Delta1-\Delta2)^2 + 0.0900(\lambda_{nominal} + 12 - 1354.6)(\Delta1-\Delta2) - 0.0517(\lambda_{nominal} + 12 - 1411.2) \quad (45).$$

In addition, the relationship between a and (Δ1−Δ2) with respect to MFD [μm] at the wavelength of 1310 nm, in the ranges of 3 μm≤a≤5 μm and 0.3%≤(Δ1−Δ2)≤0.6%, is expressed in the following Formula (46):

$$(\Delta1-\Delta2) = (-0.0148\text{MFD} + 0.213)[a - 0.619\text{MFD} + 2.01]^2 - 0.0771\text{MFD} + 1.033 \quad (46).$$

Therefore, in order for the MFD [μm] to fall within a range of a value of $\text{MFD}_{nominal}$−0.4 μm or more and a value of $\text{MFD}_{nominal}$+0.4 μm or less, the relationship between a and (Δ1−Δ2) preferably satisfies the following Formulas (47) and (48):

$$(\Delta1-\Delta2) \leq [-0.0148(\text{MFD}_{nominal}+0.4)+0.213][a-0.619(\text{MFD}_{nominal}+0.4)+2.01]^2 - 0.0771(\text{MFD}_{nominal}+0.4)+1.033 \quad (47); \text{ and}$$

$$(\Delta1-\Delta2) \geq [-0.0148(\text{MFD}_{nominal}-0.4)+0.213][a-0.619(\text{MFD}_{nominal}-0.4)+2.01]^2 - 0.0771(\text{MFD}_{nominal}-0.4)+1.033 \quad (48).$$

It is sufficient to set b/a and Δ2 so that $\lambda_{cc}$ is 1260 nm or less or 1360 nm or less, and the zero-dispersion slope is 0.092 ps/(nm²·km). For this purpose, Δ2 preferably falls within a range of −0.1% or more and 0.0% or less, and b/a preferably falls within a range of 2 or more and 4 or less.

Next, a preferable center-to-center interval Λ between adjacent cores will be described. FIG. 4 is a graph illustrating a relationship between the center-to-center interval Λ between the adjacent cores and MFD/$\lambda_{cc}$ of a case where the counter propagation XT at the wavelength of 1360 nm after the propagation for 10 km (corresponding to the fiber length of 10 km) is −20 dB (=−20 dB/10 km), in the four-core MCF having a square core arrangement. Here, an average value R of the fiber bending radii is 0.14 m. As long as R is 0.14 m or less, a lower XT is achievable. Note that $\lambda_{cc}$ denotes a cable cutoff wavelength that has been measured with a configuration (a fiber that is not formed into a cable) of FIG. 12 of ITU-T G.650.1 (March/2018).

In order to set the counter propagation XT after the propagation for 10 km at the wavelength of 1360 nm to −20 dB (=−20 dB/10 km) or less, the center-to-center interval Λ between the adjacent cores and MFD/$\lambda_{cc}$ satisfy at least one of the following Formula (49) and Formula (50) (a region above a lower dotted line illustrated in FIG. 5):

$$\Lambda \geq 2.26\text{MFD}/\lambda_{cc} + 12.0 \quad (49); \text{ and}$$

$$\text{MFD}/\lambda_{cc} \leq 0.443\Lambda - 5.33 \quad (50),$$

and preferably satisfy at least one of the following Formula (51) and Formula (52) (a region above an upper dotted line illustrated in FIG. 5):

$$\Lambda \geq 2.26\text{MFD}/\lambda_{cc} + 14.5 \quad (51); \text{ and}$$

$$\text{MFD}/\lambda_{cc} \leq 0.443\Lambda - 6.42 \quad (52).$$

Figure 6:
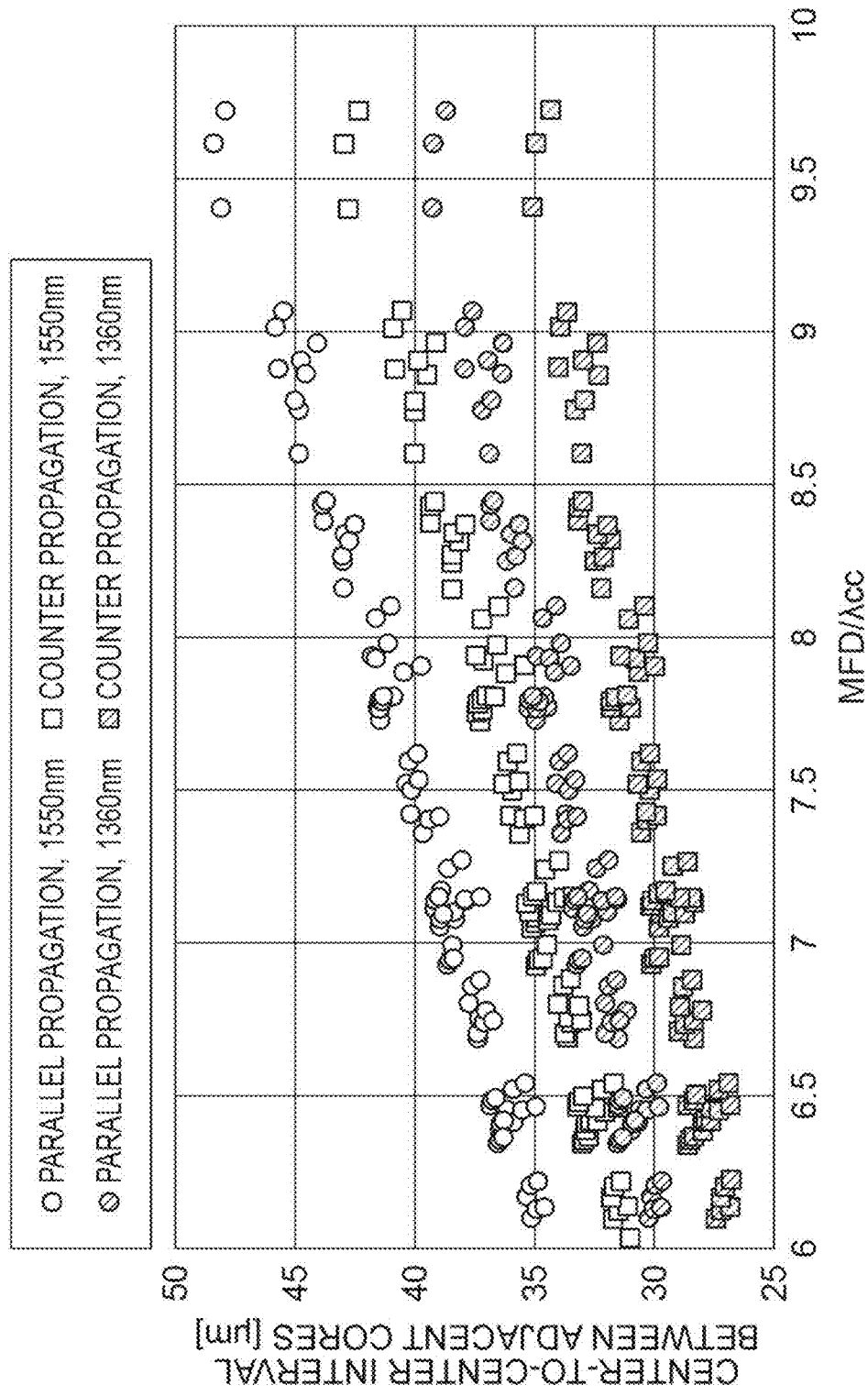
FIG. 6 is a graph illustrating a relationship between the center-to-center interval Λ between the adjacent cores and MFD/$\lambda_{cc}$ of a case where the counter propagation XT after the propagation for 10 km (corresponding to the fiber length of 10 km) of the four-core MCF is −20 dB and a case where parallel propagation XT after the propagation for 10 km (corresponding to the fiber length of 10 km) of the four-core MCF is −20 dB, at both the wavelength of 1550 nm and the wavelength of 1360 nm.

FIG. 6 is a graph illustrating a relationship between the center-to-center interval Λ between the adjacent cores and MFD/$\lambda_{cc}$ of a case where the counter propagation XT after the propagation for 10 km (corresponding to the fiber length of 10 km) of the four-core MCF is −20 dB and a case where parallel propagation XT after the propagation for 10 km (corresponding to the fiber length of 10 km) of the four-core MCF is −20 dB, at both the wavelength of 1550 nm and the wavelength of 1360 nm. Note that in FIG. 6, the above-described relationships are illustrated such that a symbol "●" represents the parallel propagation XT at the wavelength of 1550 nm, a symbol "0 (indicated by hatching in FIG. 6)" represents the parallel propagation XT at the wavelength of 1360 nm, a symbol "□" represents the counter propagation XT at the wavelength of 1550 nm, and a symbol "■ (indicated by hatching in FIG. 6)" represents the counter propagation XT at the wavelength of 1360 nm.

Figure 5:
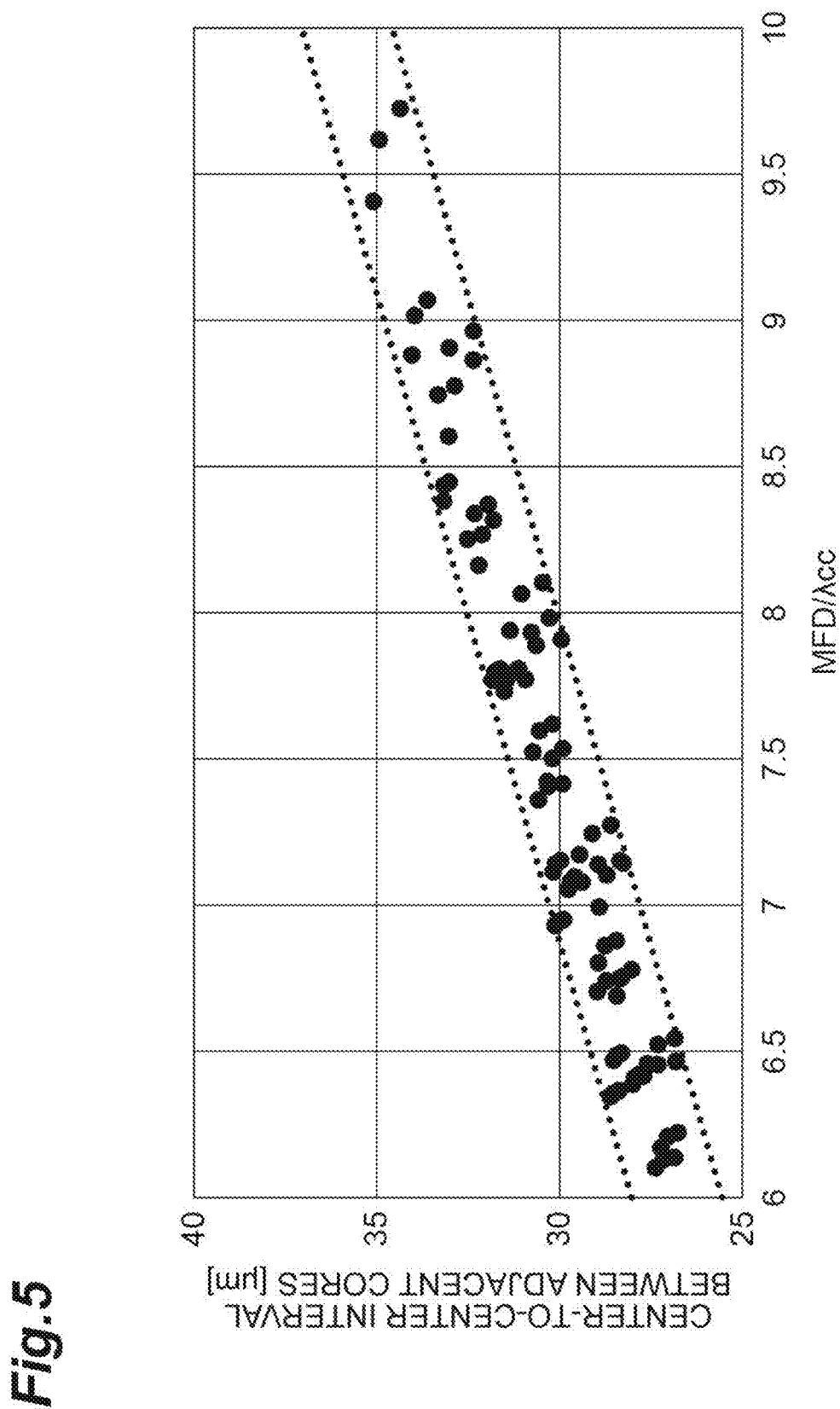
FIG. 5 is a graph illustrating a relationship between a center-to-center interval Λ between adjacent cores and MFD/$\lambda_{cc}$ of a case where a counter propagation XT at a wavelength of 1360 nm after propagation for 10 km (corresponding to a fiber length of 10 km) is −20 dB (=−20 dB/10 km), in an MCF in which four cores are arranged to constitute a square lattice (hereinafter, referred to as a "four-core MCF").

Although no dotted line is illustrated in FIG. 6, in order to set the parallel propagation XT after the propagation for 10 km at the wavelength of 1360 nm to −20 dB or less in a similar manner to the above-described case of FIG. 5, the center-to-center interval Λ between the adjacent cores and MFD/$\lambda_{cc}$ satisfy at least one of the following Formula (53) and Formula (54):

$$\Lambda \geq 2.64 \text{MFD}/\lambda_{cc}+12.6 \quad (53); \text{ and}$$

$$\text{MFD}/\lambda_{cc} \leq 0.379\Lambda-4.76 \quad (54),$$

and preferably satisfy at least one of the following Formula (55) and Formula (56):

$$\Lambda \geq 2.64 \text{MFD}/\lambda_{cc}+15.0 \quad (55); \text{ and}$$

$$\text{MFD}/\lambda_{cc} \leq 0.379\Lambda-5.68 \quad (56).$$

In order to set the counter propagation XT after the propagation for 10 km at the wavelength of 1550 nm to −20 dB or less, the center-to-center interval Λ between the adjacent cores and MFD/$\lambda_{cc}$ satisfy at least one of the following Formula (57) and Formula (58):

$$\Lambda \geq 3.13 \text{MFD}/\lambda_{cc}+10.7 \quad (57); \text{ and}$$

$$\text{MFD}/\lambda_{cc} \leq 0.320\Lambda-3.42 \quad (58),$$

and preferably satisfy at least one of the following Formula (59) and Formula (60):

$$\Lambda 3.13 \text{MFD}/\lambda_{cc}+13.4 \quad (59); \text{ and}$$

$$\text{MFD}/\lambda_{cc} \leq 0.320\Lambda-4.29 \quad (60).$$

In order to set the parallel propagation XT after the propagation for 10 km at the wavelength of 1550 nm to −20 dB or less, the center-to-center interval Λ between the adjacent cores and MFD/$\lambda_{cc}$ satisfy at least one of the following Formula (61) and Formula (62):

$$\Lambda \geq 3.66 \text{MFD}/\lambda_{cc}+10.8 \quad (61); \text{ and}$$

$$\text{MFD}/\lambda_{cc} \leq 0.273\Lambda-2.95 \quad (62),$$

and preferably satisfy at least one of the following Formula (63) and Formula (64):

$$\Lambda \geq 3.66 \text{MFD}/\lambda_{cc}+13.7 \quad (63); \text{ and}$$

$$\text{MFD}/\lambda_{cc} \leq 0.273\Lambda-3.74 \quad (64).$$

Figure 7:
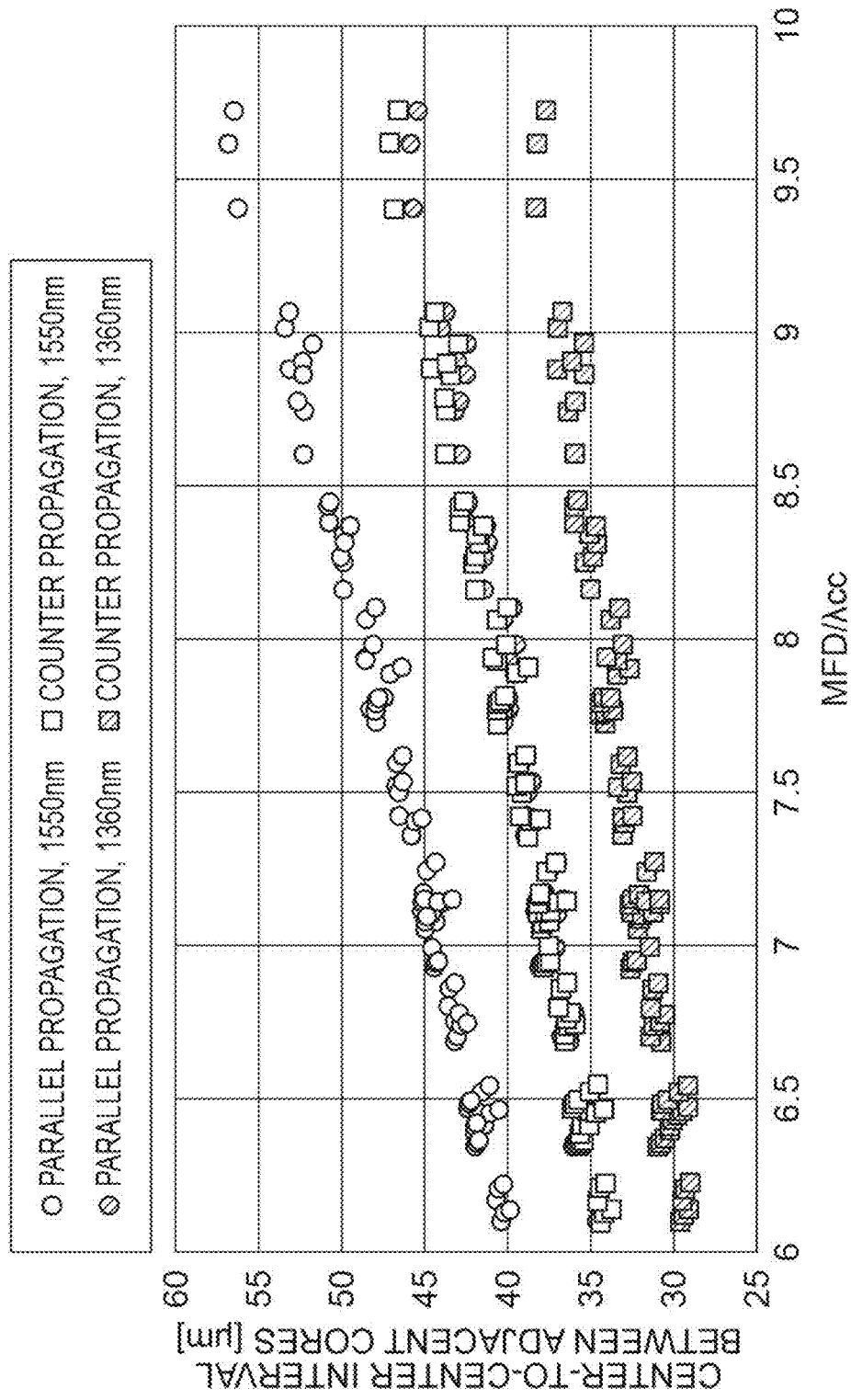
FIG. 7 is a graph illustrating a relationship between the center-to-center interval Λ between the adjacent cores and MFD/$\lambda_{cc}$ of a case where the counter propagation XT after the propagation for 10 km (corresponding to the fiber length of 10 km) of the four-core MCF is −40 dB and a case where the parallel propagation XT after the propagation for 10 km (corresponding to the fiber length of 10 km) of the four-core MCF is −40 dB, at both the wavelength of 1550 nm and the wavelength of 1360 nm.

FIG. 7 is a graph illustrating a relationship between the center-to-center interval Λ between the adjacent cores and MFD/$\lambda_{cc}$ of a case where the counter propagation XT after the propagation for 10 km (corresponding to the fiber length of 10 km) of the four-core MCF is −40 dB and a case where the parallel propagation XT after the propagation for 10 km (corresponding to the fiber length of 10 km) of the four-core MCF is −40 dB, at both the wavelength of 1550 nm and the wavelength of 1360 nm. Note that in FIG. 7, the above-described relationships are illustrated such that a symbol "○" represents the parallel propagation XT at the wavelength of 1550 nm, a symbol "● (indicated by hatching in FIG. 7)" represents the parallel propagation XT at the wavelength of 1360 nm, a symbol "□" represents the counter propagation XT at the wavelength of 1550 nm, and a symbol "■ (indicated by hatching in FIG. 7)" represents the counter propagation XT at the wavelength of 1360 nm.

Although no dotted line is illustrated in FIG. 7, either, in order to set the counter propagation XT after the propagation for 10 km at the wavelength of 1360 nm to −40 dB or less in a similar manner to the above-described case of FIG. 5, the center-to-center interval Λ between the adjacent cores and MFD/$\lambda_{cc}$ satisfy at least one of the following Formula (65) and Formula (66):

$$\Lambda \geq 2.55 \text{MFD}/\lambda_{cc}+12.4 \quad (65); \text{ and}$$

$$\text{MFD}/\lambda_{cc} \leq 0.392\Lambda-4.88 \quad (66).$$

and preferably satisfy at least one of the following Formula (67) and Formula (68):

$$\Lambda \geq 2.55 \text{MFD}/\lambda_{cc}+14.9 \quad (67); \text{ and}$$

$$\text{MFD}/\lambda_{cc} \leq 0.392\Lambda-5.83 \quad (68).$$

In order to set the parallel propagation XT after the propagation for 10 km at the wavelength of 1360 nm to −40 dB or less, the center-to-center interval Λ between the adjacent cores and MFD/$\lambda_{cc}$ satisfy at least one of the following Formula (69) and Formula (70):

$$\Lambda \geq 3.22 \text{MFD}/\lambda_{cc}+13.4 \quad (69); \text{ and}$$

$$\text{MFD}/\lambda_{cc} \leq 0.310\Lambda-4.16 \quad (70),$$

and preferably satisfy at least one of the following Formula (71) and Formula (72):

$$\Lambda \geq 3.22 \text{MFD}/\lambda_{cc}+15.7 \quad (71); \text{ and}$$

$$\text{MFD}/\lambda_{cc} \leq 0.310\Lambda-4.88 \quad (72).$$

In order to set the counter propagation XT after the propagation for 10 km at the wavelength of 1550 nm to −40 dB or less, the center-to-center interval Λ between the adjacent cores and MFD/$\lambda_{cc}$ satisfy at least one of the following Formula (73) and Formula (74):

$$\Lambda \geq 3.54 \text{MFD}/\lambda_{cc}+10.8 \quad (73); \text{ and}$$

$$\text{MFD}/\lambda_{cc} \leq 0.283\Lambda-3.05 \quad (74),$$

and preferably satisfy at least one of the following Formula (75) and Formula (76):

$$\Lambda \geq 3.54 \text{MFD}/\lambda_{cc}+13.6 \quad (75); \text{ and}$$

$$\text{MFD}/\lambda_{cc} \leq 0.283\Lambda-3.85 \quad (76).$$

In order to set the parallel propagation XT after the propagation for 10 km at the wavelength of 1550 nm to −40 dB or less, the center-to-center interval Λ between the adjacent cores and MFD/$\lambda_{cc}$ satisfy at least one of the following Formula (77) and Formula (78):

$$\Lambda \geq 4.47 \text{MFD}/\lambda_{cc}+11.0 \quad (77); \text{ and}$$

$$\text{MFD}/\lambda_{cc} \leq 0.223\Lambda-2.46 \quad (78),$$

and preferably satisfy at least one of the following Formula (79) and Formula (80):

$$\Lambda \geq 4.47 \text{MFD}/\lambda_{cc}+14.1 \quad (79); \text{ and}$$

$$\text{MFD}/\lambda_{cc} \leq 0.223\Lambda-3.16 \quad (80).$$

In order to allow the position of each core to vary from the design center, Λ preferably takes a margin of 1 μm from the range in each of the above Formulas. Therefore, in order to set the counter propagation XT after the propagation for 10 km at the wavelength of 1360 nm to −20 dB or less, the nominal value $\Lambda_{nominal}$ of $\Lambda$ preferably satisfies at least the following Formula (81):

$$\Lambda_{nominal} \geq 2.26 MFD/\lambda_{cc} + 12.0 + 1.0 \quad (81),$$

and more preferably satisfies the following Formula (82):

$$\Lambda_{nominal} \geq 2.26 MFD/\lambda_{cc} + 14.5 + 1.0 \quad (82).$$

In order to set the parallel propagation XT after the propagation for 10 km at the wavelength of 1360 nm to −20 dB or less, the nominal value $\Lambda_{nominal}$ preferably satisfies at least the following Formula (83):

$$\Lambda_{nominal} \geq 2.64 MFD/\lambda_{cc} + 12.6 + 1.0 \quad (83),$$

and more preferably satisfies the following Formula (84):

$$\Lambda_{nominal} \geq 2.64 MFD/\lambda_{cc} + 15.0 + 1.0 \quad (84).$$

In order to set the counter propagation XT after the propagation for 10 km at the wavelength of 1550 nm to −20 dB or less, the nominal value $\Lambda_{nominal}$ preferably satisfies at least the following Formula (85):

$$\Lambda_{nominal} \geq 3.13 MFD/\lambda_{cc} + 10.7 + 1.0 \quad (85),$$

and more preferably satisfies the following Formula (86):

$$\Lambda_{nominal} \geq 3.13 MFD/\lambda_{cc} + 13.4 + 1.0 \quad (86).$$

In order to set the parallel propagation XT after the propagation for 10 km at the wavelength of 1550 nm to −20 dB or less, the nominal value $\Lambda_{nominal}$ preferably satisfies at least the following Formula (87):

$$\Lambda_{nominal} \geq 3.66 MFD/\lambda_{cc} + 10.8 + 1.0 \quad (87),$$

and more preferably satisfies the following Formula (88):

$$\Lambda_{nominal} \geq 3.66 MFD/\lambda_{cc} + 13.7 + 1.0 \quad (88).$$

In order to set the counter propagation XT at the wavelength of 1360 nm to −40 dB or less, the nominal value $\Lambda_{nominal}$ preferably satisfies at least the following Formula (89):

$$\Lambda_{nominal} \geq 2.55 MFD/\lambda_{cc} + 12.4 + 1.0 \quad (89),$$

and more preferably satisfies the following Formula (90):

$$\Lambda_{nominal} \geq 2.55 MFD/\lambda_{cc} + 14.9 + 1.0 \quad (90).$$

In order to set the parallel propagation XT after the propagation for 10 km at the wavelength of 1360 nm to −40 dB or less, the nominal value $\Lambda_{nominal}$ preferably satisfies at least the following Formula (91):

$$\Lambda_{nominal} \geq 3.22 MFD/\lambda_{cc} + 13.4 + 1.0 \quad (91),$$

and more preferably satisfies the following Formula (92):

$$\Lambda_{nominal} \geq 3.22 MFD/\lambda_{cc} + 15.7 + 1.0 \quad (92).$$

In order to set the counter propagation XT after the propagation for 10 km at the wavelength of 1550 nm to −40 dB or less, the nominal value $\Lambda_{nominal}$ satisfies at least the following Formula (93):

$$\Lambda_{nominal} \geq 3.54 MFD/\lambda_{cc} + 10.8 + 1.0 \quad (93),$$

and more preferably satisfies the following Formula (94):

$$\Lambda_{nominal} \geq 3.54 MFD/\lambda_{cc} + 13.6 + 1.0 \quad (94).$$

In order to set the parallel propagation XT after the propagation for 10 km at the wavelength of 1550 nm to −40 dB or less, the nominal value $\Lambda_{nominal}$ preferably satisfies at least the following Formula (95):

$$\Lambda_{nominal} \geq 4.47 MFD/\lambda_{cc} + 11.0 + 1.0 \quad (95),$$

and more preferably satisfies the following Formula (96):

$$\Lambda_{nominal} \geq 4.47 MFD/\lambda_{cc} + 14.1 + 1.0 \quad (96).$$

Regarding the above $\Lambda_{nominal}$, $\Lambda$ is preferably expressed in the following Formula (97):

$$\Lambda_{nominal} - 0.9 \leq \Lambda \leq \Lambda_{nominal} + 0.9 \quad (97).$$

This can be considered as an approximation of a case where the position of each core independently varies from the design center with Gaussian distribution of $3\sigma = 0.9$ μm being as probability distribution. In this situation, the probability that $\Lambda$ does not satisfy any one of the above predetermined Formulas (81) to (96) for defining $\Lambda_{nominal}$ is suppressed to 1% or less. Furthermore, regarding $\Lambda_{nominal}$, $\Lambda$ preferably satisfies the following Formula (98):

$$\Lambda_{nominal} - 0.7 \leq \Lambda \leq \Lambda_{nominal} + 0.7 \quad (98).$$

This can be considered as an approximation of a case where the position of each core independently varies from the design center with Gaussian distribution of $3\sigma = 0.7$ μm being as probability distribution. In this situation, the probability that $\Lambda$ does not satisfy any one of the above predetermined Formulas (81) to (96) for defining $\Lambda_{nominal}$ is suppressed to 0.1% or less. Furthermore, regarding $\Lambda_{nominal}$, $\Lambda$ preferably satisfies the following Formula (99):

$$\Lambda_{nominal} - 0.5 \leq \Lambda \leq \Lambda_{nominal} + 0.5 \quad (99).$$

This can be considered as an approximation of a case where the position of each core independently varies from the design center with Gaussian distribution of $3\sigma = 0.5$ μm being as probability distribution. In this situation, a probability that $\Lambda$ does not satisfy any one of the above predetermined Formulas (81) to (96) for defining $\Lambda_{nominal}$ is suppressed to 0.001% or less.

Figure 8:
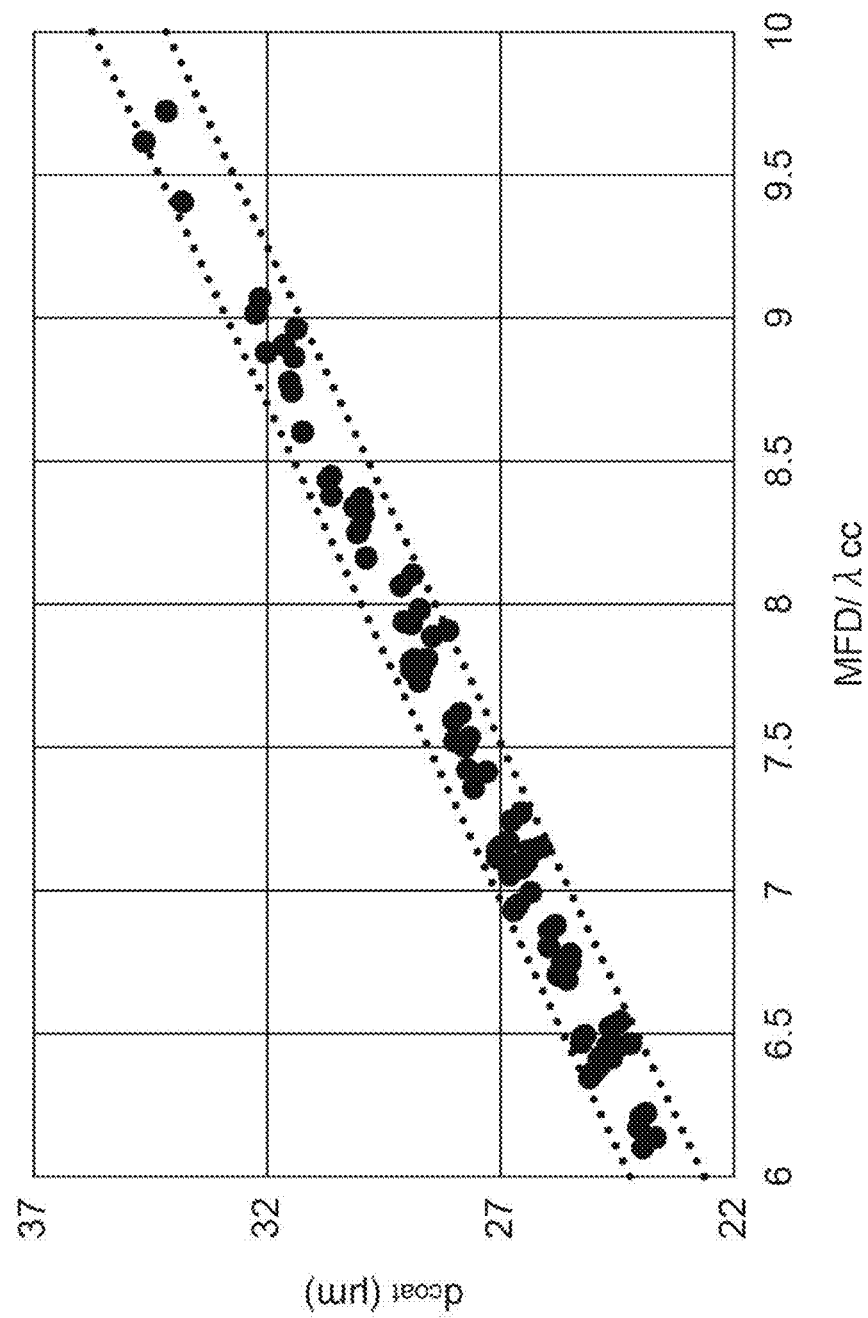
FIG. 8 is a graph illustrating a relationship between $d_{coat}$ and MFD/$\lambda_{cc}$ of a case where a leakage loss to the coating at the wavelength of 1360 nm is 0.01 dB/km, in the four-core MCF.

Next, a description will be given with regard to desirable $d_{coat}$ (the shortest distance from the interface between the resin coating and the cladding to the core center). FIG. 8 is a graph illustrating a relationship between $d_{coat}$ and MFD/$\lambda_{cc}$ of a case where a leakage loss to the coating at the wavelength of 1360 nm is 0.01 dB/km, in the four-core MCF.

In order to set the leakage loss to the resin coating to 0.01 dB/km at the wavelength of 1360 nm, $d_{coat}$ and MFD/$\lambda_{cc}$ satisfy at least one of the following Formula (100) and Formula (101) (a region above a lower dotted line illustrated in FIG. 8):

$$d_{coat} \geq 2.88 MFD/\lambda_{cc} + 5.36 \quad (100); \text{ and}$$

$$MFD/\lambda_{cc} \leq 0.347 d_{coat} - 1.86 \quad (101).$$

Furthermore, $d_{coat}$ and MFD/$\lambda_{cc}$ preferably satisfy at least one of the following Formula (102) and Formula (103) (a region above the upper dotted line illustrated in FIG. 8):

$$d_{coat} \geq 2.88 MFD/\lambda_{cc} + 6.95 \quad (102); \text{ and}$$

$$MFD/\lambda_{cc} \leq 0.347 d_{coat} - 2.41 \quad (103).$$

$d_{coat}$ of the outermost peripheral core (that is, the minimum value of $d_{coat}$) is generally referred to as an outer cladding thickness (OCT). However, $d_{coat}$ according to the present disclosure is defined as a value that can be regulated for each core.

In order to allow the position of each core to vary from the design center and to allow the cladding diameter to vary from the design center, $d_{coat}$ preferably takes a margin of at least 1 μm from the ranges of the above Formulas (100) to (103). Thus, regarding $d_{coat}$, by setting a nominal value of $d_{coat}$ to $d_{coat,nominal}$, at least the following Formula (104):

$$d_{coat,nominal} \geq 2.88 MFD/\lambda_{cc} + 5.36 + 1.0 \tag{104}$$

is satisfied.

Furthermore, the nominal value $CD_{nominal}$ of the cladding diameter is preferably set to satisfy the following Formula (105):

$$d_{coat,nominal} \geq 2.88 MFD/\lambda_{cc} + 6.95 + 1.0 \tag{105}$$

In this situation, both the following Formulas (106) and (107):

$$\Lambda_{nominal} - 0.9 \leq \Lambda \leq \Lambda_{nominal} + 0.9 \tag{106; and}$$

$$CD_{nominal} - 0.9 \leq CD \leq CD_{nominal} + 0.9 \tag{107}$$

are preferably satisfied.

The probability that $d_{coat}$ does not satisfy at least one of Formula (100) and Formula (102) is suppressed to 1% or less. Further, both the following Formulas (108) and (109):

$$\Lambda_{nominal} - 0.7 \leq \Lambda \leq \Lambda_{nominal} + 0.7 \tag{108; and}$$

$$\Lambda_{nominal} - 0.7 \leq CD \leq CD_{nominal} + 0.9 \tag{109}$$

are preferably satisfied.

In this situation, the probability that $d_{coat}$ does not satisfy at least one of Formula (100) and Formula (102) is suppressed to 0.1% or less.

Further, both the following Formulas (110) and (111):

$$\Lambda_{nominal} - 0.5 \leq \Lambda \leq \Lambda_{nominal} + 0.5 \tag{110; and}$$

$$CD_{nominal} - 0.5 \leq CD \leq CD_{nominal} + 0.5 \tag{111}$$

are preferably satisfied.

In this situation, the probability that $d_{coat}$ does not satisfy at least one of Formula (100) and Formula (102) is suppressed to 0.001% or less.

Figure 9:
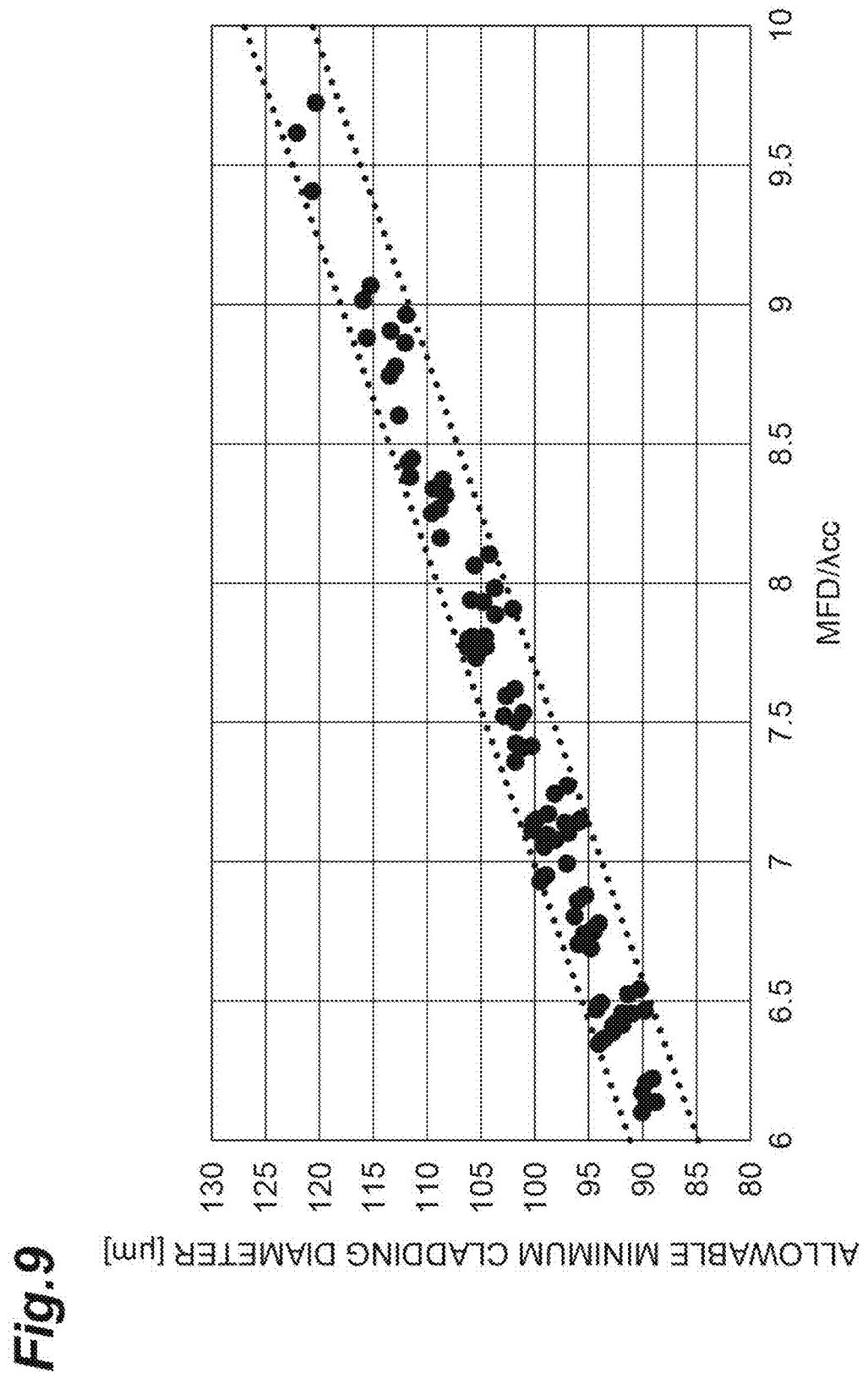
FIG. 9 is a graph illustrating a relationship between a CD (an allowable minimum cladding diameter) and MFD/$\lambda_{cc}$ of a case where a margin of 1 μm is added to $d_{coat}$, when the leakage loss to the coating at the wavelength of 1360 nm is 0.01 dB/km, and the margin of 1 μm is added to Λ, when the counter propagation XT at the wavelength of 1360 nm after the propagation for 10 km (corresponding to the fiber length of 10 km) is −20 dB (=−20 dB/10 km), in the four-core MCF.

Next, a minimum allowable $CD_{nominal}$ will be described. FIG. 9 is a graph illustrating a relationship between a CD (an allowable minimum cladding diameter) and MFD/$\lambda_{cc}$ of a case where a margin of 1 μm is added to $d_{coat}$, when the leakage loss to the coating at the wavelength of 1360 nm is 0.01 dB/km, and the margin of 1 μm is added to Λ, when the counter propagation XT at the wavelength of 1360 nm after the propagation for 10 km (corresponding to the fiber length of 10 km) is −20 dB (=−20 dB/10 km), in the four-core MCF. Note that in FIG. 9, in a case where x axis indicates MFD/$\lambda_{cc}$ and y axis indicates CD, an upper dotted line is represented by y=8.95x+37.47 (x=0.1117y−4.186), and a lower dotted line is represented by y=8.95x+31.13 (x=0.1117y−3.478).

In order to set the leakage loss to the coating at the wavelength of 1360 nm to 0.01 dB/km or less and to set the counter propagation XT after the propagation for 10 km to −20 dB or less in consideration of the tolerance in the dimensions of the core position and the cladding diameter, the relationship between $CD_{nominal}$ and MFD/$\lambda_{cc}$ satisfies at least one of the following Formula (112) and Formula (113) (a region above the lower dotted line in FIG. 9):

$$CD_{nominal} \geq 8.95 MFD/\lambda_{cc} + 31.13 \tag{112; and}$$

$$MFD/\lambda_{cc} \leq 0.1117 CD_{nominal} - 3.478 \tag{113}$$

and preferably further satisfies at least one of the following Formula (114) and Formula (115) (a region above the upper dotted line in FIG. 9):

$$CD_{nominal} \geq 8.95 MFD/\lambda_{cc} + 37.47 \tag{114; and}$$

$$MFD/\lambda_{cc} \leq 0.1117 CD_{nominal} - 4.186 \tag{115}$$

Figure 10:
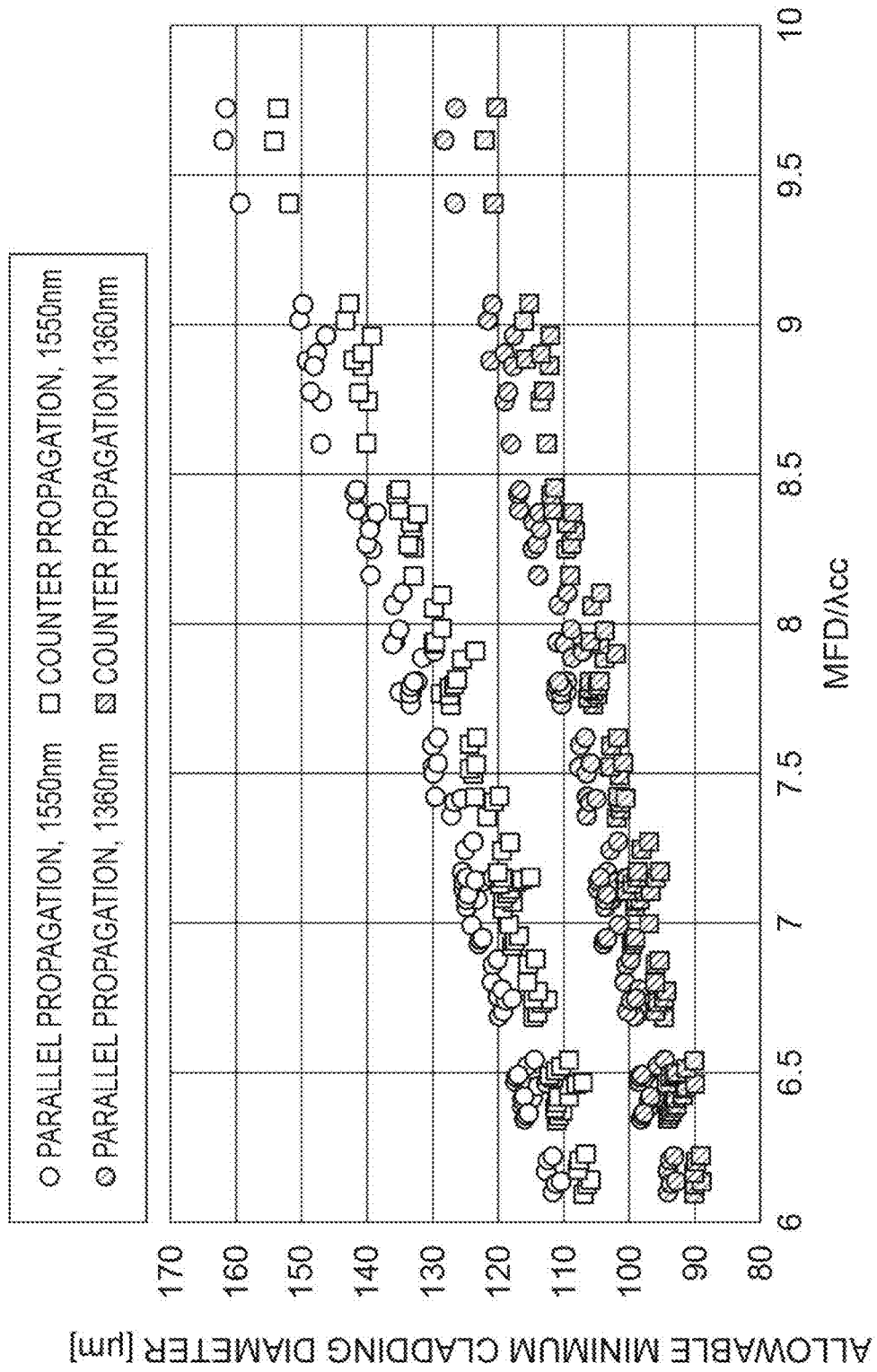
FIG. 10 is a graph illustrating a relationship between the CD (the allowable minimum cladding diameter) and MFD/$\lambda_{cc}$ of a case where a margin of 1 μm is added to $d_{coat}$ and the margin of 1 μm is added to Λ, when the leakage loss to the coating is 0.01 dB/km, under a condition that the counter propagation XT after the propagation for 10 km (corresponding to the fiber length of 10 km) of the four-core MCF is −20 dB (=−20 dB/10 km) and the parallel propagation XT (an XT at general propagation in an identical direction) after the propagation for 10 km (corresponding to the fiber length of 10 km) is −20 dB (=−20 dB/10 km), at both the wavelength of 1550 nm and the wavelength of 1360 inn.

FIG. 10 is a graph illustrating a relationship between the CD (the allowable minimum cladding diameter) and MFD/$\lambda_{cc}$ of a case where a margin of 1 μm is added to $d_{coat}$ and the margin of 1 μm is added to Λ, when the leakage loss to the coating is 0.01 dB/km, under a condition that the counter propagation XT after the propagation for 10 km (corresponding to the fiber length of 10 km) of the four-core MCF is −20 dB (=−20 dB/10 km) and the parallel propagation XT (an XT at general propagation in an identical direction) after the propagation for 10 km (corresponding to the fiber length of 10 km) is −20 dB (=−20 dB/10 km), at both the wavelength of 1550 nm and the wavelength of 1360 nm. Note that in FIG. 10, the above-described relationships are illustrated such that a symbol "○" represents the parallel propagation XT at the wavelength of 1550 nm, a symbol "●" (indicated by hatching in FIG. 10)" represents the parallel propagation XT at the wavelength of 1360 nm, a symbol "□" represents the counter propagation XT at the wavelength of 1550 nm, and a symbol "■ (indicated by hatching in FIG. 10)" represents the counter propagation XT at the wavelength of 1360 nm.

Although no dotted line is illustrated in FIG. 10, in the four-core MCF having the square core arrangement in a similar manner to the case of FIG. 5 or the like, in order to set the leakage loss to the coating at the wavelength of 1360 inn to 0.01 dB/km or less and to set the parallel propagation XT after the propagation for 10 km to −20 dB or less, in consideration of the tolerance in the dimensions of the core position and the cladding diameter, the relationship between $CD_{nominal}$ and MFD/$\lambda_{cc}$ satisfies at least one of the following Formula (116) and Formula (117):

$$CD_{nominal} \geq 9.49 MFD/\lambda_{cc} + 31.91 \tag{116; and}$$

$$MFD/\lambda_{cc} \leq 0.1054 CD_{nominal} - 3.363 \tag{117}$$

and preferably further satisfies at least one of the following Formula (118) and Formula (119):

$$CD_{nominal} \geq 9.49 MFD/\lambda_{cc} + 38.16 \tag{118; and}$$

$$MFD/\lambda_{cc} \leq 0.1054 CD_{nominal} - 4.021 \tag{119}$$

In order to set the leakage loss to the coating at the wavelength of 1550 nm to 0.01 dB/km or less and to set the counter propagation XT after the propagation for 10 km to −20 dB or less, the relationship between $CD_{nominal}$ and MFD/$\lambda_{cc}$ satisfies at least one of the following Formula (120) and Formula (121):

$$CD_{nominal} \geq 12.56 MFD/\lambda_{cc} + 24.30 \tag{120; and}$$

$$MFD/\lambda_{cc} \leq 0.07960 CD_{nominal} - 1.934 \tag{121}$$

and preferably further satisfies at least one of the following Formula (122) and Formula (123):

$$CD_{nominal} \geq 12.56 MFD/\lambda_{cc} + 33.78 \tag{122; and}$$

$$MFD/\lambda_{cc} \geq 0.07960 CD_{nominal} - 2.688 \tag{123}$$

In order to set the leakage loss to the coating at the wavelength of 1550 nm to 0.01 dB/km or less and to set the parallel propagation XT after the propagation for 10 km to −20 dB or less, the relationship between $CD_{nominal}$ and MFD/$\lambda_{cc}$ satisfies at least one of the following Formula (124) and Formula (125):

$$CD_{nominal} \geq 13.31 MFD/\lambda_{cc} + 24.47 \tag{124; and}$$

$$MFD/\lambda_{cc} \leq 0.07511 CD_{nominal} - 1.838 \tag{125}$$

and preferably satisfies at least one of the following Formula (126) and Formula (127):

$$CD_{nominal} \geq 13.31 MFD/\lambda_{cc} + 34.18 \quad (126); \text{ and}$$

$$MFD/\lambda_{cc} \leq 0.07511 CD_{nominal} - 2.567 \quad (127).$$

In the four-core fiber having the square core arrangement, in order to set the leakage loss to the coating at the wavelength of 1360 nm to 0.01 dB/km or less and to set the counter propagation XT after the propagation for 10 km to −20 dB or less, in consideration of the tolerance in the dimensions of the core position and the cladding diameter, in a case where $CD_{nominal}$ is 125 μm, 120 μm, 115 μm, 110 μm, 105 μm, 100 μm, 95 μm, 90 μm, 85 μm, and 80 μm, $MFD/\lambda_{cc}$ is preferably 10.49 or less, 9.93 or less, 9.37 or less, 8.81 or less, 8.25 or less, 7.69 or less, 7.14 or less, 6.58 or less, 6.02 or less, or 5.46 or less in the order of numerical values of the $CD_{nominal}$ as listed above, and $MFD/\lambda_{cc}$ is more preferably 9.78 or less, 9.22 or less, 8.66 or less, 8.10 or less, 7.54 or less, and 6.99 or less, 6.43 or less, 5.87 or less, 5.31 or less, 4.75 or less in the order of numerical values of the $CD_{nominal}$ as listed above.

In order to set the leakage loss to the coating at the wavelength of 1360 nm to 0.01 dB/km or less and to set the parallel propagation XT after the propagation for 10 km to −20 dB or less, $MFD/\lambda_{cc}$ is preferably 9.81 or less, 9.28 or less, 8.76 or less, 8.23 or less, 7.70 or less, 7.17 or less, 6.65 or less, 6.12 or less, 5.59 or less, or 5.07 or less in the order of the numerical values of the $CD_{nominal}$ as listed above, and $MFD/\lambda_{cc}$ is more preferably 9.15 or less, 8.62 or less, 8.10 or less, 7.57 or less, 7.04 or less, 6.52 or less, 5.99 or less, 5.46 or less, 4.94 or less, or 4.41 or less in the order of the numerical values of the $CD_{nominal}$ as listed above.

In order to set the leakage loss to the coating at the wavelength of 1550 nm to 0.01 dB/km or less and to set the counter propagation XT after the propagation for 10 km to −20 dB or less, $MFD/\lambda_{cc}$ is preferably 8.02 or less, 7.62 or less, 7.22 or less, 6.82 or less, 6.42 or less, 6.03 or less, 5.63 or less, 5.23 or less, 4.83 or less, or 4.43 or less in the order of the numerical values of the $CD_{nominal}$ as listed above, and $MFD/\lambda_{cc}$ is more preferably 7.26 or less, 6.86 or less, 6.47 or less, 6.07 or less, 5.67 or less, 5.27 or less, 4.87 or less, 4.48 or less, 4.08 or less, or 3.68 or less in the order of the numerical values of the $CD_{nominal}$ as listed above.

In order to set the leakage loss to the coating at the wavelength of 1550 nm to 0.01 dB/km or less and to set the parallel propagation XT after the propagation for 10 km to −20 dB or less, $MFD/\lambda_{cc}$ is preferably 7.55 or less, 7.18 or less, 6.80 or less, 6.42 or less, 6.05 or less, 5.67 or less, 5.30 or less, 4.92 or less, 4.55 or less, or 4.17 or less in the order of the numerical values of the $CD_{nominal}$ as listed above, and $MFD/\lambda_{cc}$ is more preferably 6.82 or less, 6.45 or less, 6.07 or less, 5.69 or less, 5.32 or less, 4.94 or less, 4.57 or less, 4.19 or less, 3.82 or less, or 3.44 or less in the order of the numerical values of the $CD_{nominal}$ as listed above.

Figure 11:
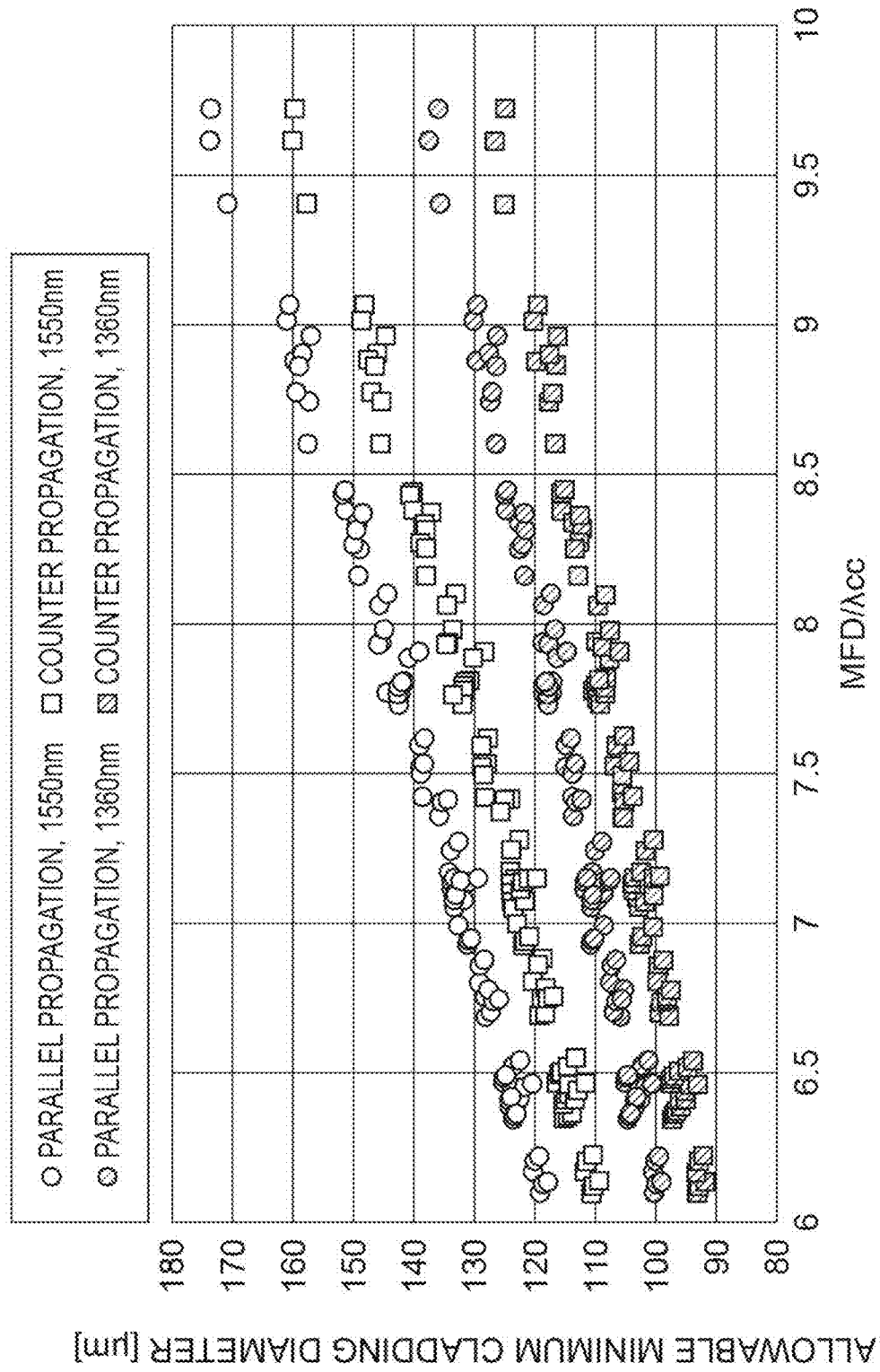
FIG. 11 is a graph illustrating a relationship between the CD (the allowable minimum cladding diameter) and MFD/$\lambda_{cc}$ of a case where a margin of 1 μm is added to $d_{coat}$ and the margin of 1 μm is added to Λ, when the leakage loss to the coating is 0.01 dB/km, under a condition that the counter propagation XT after the propagation for 10 km (corresponding to the fiber length of 10 km) of the four-core MCF is −40 dB (=−40 dB/10 km) and the parallel propagation XT after the propagation for 10 km (corresponding to the fiber length of 10 km) is −40 dB (=−40 dB/10 km), at both the wavelength of 1550 nm and the wavelength of 1360 nm.

FIG. 11 is a graph illustrating a relationship between the CD (the allowable minimum cladding diameter) and $MFD/\lambda_{cc}$ of a case where a margin of 1 μm is added to $d_{coat}$ and the margin of 1 μm is added to Λ, when the leakage loss to the coating is 0.01 dB/km, under a condition that the counter propagation XT after the propagation for 10 km (corresponding to the fiber length of 10 km) of the four-core MCF is −40 dB (=−40 dB/10 km) and the parallel propagation XT after the propagation for 10 km (corresponding to the fiber length of 10 km) is −40 dB (=−40 dB/10 km), at both the wavelength of 1550 nm and the wavelength of 1360 nm.

Note that in FIG. 11, the above-described relationships are illustrated such that a symbol "○" represents the parallel propagation XT at the wavelength of 1550 nm, a symbol "●" (indicated by hatching in FIG. 11)" represents the parallel propagation XT at the wavelength of 1360 nm, a symbol "□" represents the counter propagation XT at the wavelength of 1550 nm, and a symbol "■ (indicated by hatching in FIG. 11)" represents the counter propagation XT at the wavelength of 1360 nm.

Although no dotted line is illustrated in FIG. 11, in a similar manner to the case of FIG. 5 or the like, in order to set the leakage loss to the coating at the wavelength of 1360 nm to 0.01 dB/km or less and to set the counter propagation XT after the propagation for 10 km to −40 dB or less, in consideration of the tolerance in the dimensions of the core position and the cladding diameter, the relationship between $CD_{nominal}$ and $MFD/\lambda_{cc}$ preferably satisfies at least one of the following Formula (128) and Formula (129):

$$CD_{nominal} \geq 9.37 MFD/\lambda_{cc} + 31.73 \quad (128); \text{ and}$$

$$MFD/\lambda_{cc} \leq 0.1068 CD_{nominal} - 3.388 \quad (129),$$

and more preferably satisfies at least one of the following Formula (130) and Formula (131):

$$CD_{nominal} \geq 9.37 MFD/\lambda_{cc} + 38.00 \quad (130); \text{ and}$$

$$MFD/\lambda_{cc} \leq 0.1068 CD_{nominal} - 4.058 \quad (131).$$

In order to set the leakage loss to the coating at the wavelength of 1360 nm to 0.01 dB/km or less and to set the parallel propagation XT after the propagation for 10 km to −40 dB or less, the relationship between $CD_{nominal}$ and $MFD/\lambda_{cc}$ preferably satisfies at least one of the following Formula (132) and (133):

$$CD_{nominal} \geq 10.32 MFD/\lambda_{cc} + 33.11 \quad (132); \text{ and}$$

$$MFD/\lambda_{cc} \leq 0.09690 CD_{nominal} - 3.208 \quad (133),$$

and more preferably satisfies at least one of the following Formula (134) and Formula (135):

$$CD_{nominal} \geq 10.32 MFD/\lambda_{cc} + 39.23 \quad (134); \text{ and}$$

$$MFD/\lambda_{cc} \leq 0.09690 CD_{nominal} - 3.802 \quad (135).$$

In order to set the leakage loss to the coating at the wavelength of 1550 nm to 0.01 dB/km or less and to set the counter propagation XT after the propagation for 10 km to −40 dB or less, the relationship between $CD_{nominal}$ and $MFD/\lambda_{cc}$ satisfies at least one of the following Formula (136) and Formula (137):

$$CD_{nominal} \geq 13.14 MFD/\lambda_{cc} + 24.43 \quad (136); \text{ and}$$

$$MFD/\lambda_{cc} \leq 0.07610 CD_{nominal} - 1.859 \quad (137),$$

and preferably satisfies at least one of the following Formula (138) and Formula (139):

$$CD_{nominal} \geq 13.14 MFD/\lambda_{cc} + 34.09 \quad (138); \text{ and}$$

$$MFD/\lambda_{cc} \leq 0.07610 CD_{nominal} - 2.594 \quad (139).$$

In order to set the leakage loss to the coating at the wavelength of 1550 nm to 0.01 dB/km or less and to set the parallel propagation XT after the propagation for 10 km to −40 dB or less, the relationship between $CD_{nominal}$ and $MFD/\lambda_{cc}$ satisfies at least one of the following Formula (140) and Formula (141):

$$CD_{nominal} \geq 14.47 MFD/\lambda_{cc} + 24.73 \quad (140); \text{ and}$$

$$MFD/\lambda_{cc} \leq 0.06911 CD_{nominal} - 1.709 \quad (141),$$

and preferably satisfies at least one of the following Formula (142) and Formula (143):

$$CD_{nominal} \geq 14.47 MFD/\lambda_{cc} + 34.08 \qquad (142); \text{ and}$$

$$MFD/\lambda_{cc} \leq 0.06911 CD_{nominal} - 2.406 \qquad (143).$$

In the four-core MCF having the square core arrangement, in order to set the leakage loss to the coating at the wavelength of 1360 nm to 0.01 dB/km or less and to set the counter propagation XT after the propagation for 10 km to −40 dB or less, in consideration of the tolerance in the dimensions of the core position and the cladding diameter, in a case where $CD_{nominal}$ is 125 μm, 120 μm, 115 μm, 110 μm, 105 μm, 100 μm, 95 μm, 90 μm, 85 μm, and 80 μm, $MFD/\lambda_{cc}$ is preferably 9.96 or less, 9.42 or less, 8.89 or less, 8.36 or less, 7.82 or less, 7.29 or less, 6.76 or less, 6.22 or less, 5.69 or less, or 5.15 or less in the order of the numerical values of the $CD_{nominal}$ as listed above, and $MFD/\lambda_{cc}$ is more preferably 9.29 or less, 8.76 or less, 8.22 or less, 7.69 or less, 7.15 or less, 6.62 or less, 6.09 or less, 5.55 or less, 5.02 or less, or 4.48 or less in the order of the numerical values of the $CD_{nominal}$ as listed above.

In order to set the leakage loss to the coating at the wavelength of 1360 nm to 0.01 dB/km or less and to set the parallel propagation XT after the propagation for 10 km to −40 dB or less, $MFD/\lambda_{cc}$ is preferably 8.90 or less, 8.42 or less, 7.94 or less, 7.45 or less, 6.97 or less, 6.48 or less, 6.00 or less, 5.51 or less, 5.03 or less, or 4.54 or less in the order of the numerical values of the $CD_{nominal}$ as listed above, and the $MFD/\lambda_{cc}$ is more preferably 8.31 or less, 7.83 or less, 7.34 or less, 6.86 or less, 6.37 or less, 5.89 or less, 5.40 or less, 4.92 or less, 4.43 or less, or 3.95 or less in the order of the numerical values of the $CD_{nominal}$ as listed above.

In order to set the leakage loss to the coating at the wavelength of 1550 nm to 0.01 dB/km or less and to set the counter propagation XT after the propagation for 10 km to −40 dB or less, the $MFD/\lambda_{cc}$ is preferably 7.65 or less, 7.27 or less, 6.89 or less, 6.51 or less, 6.13 or less, 5.75 or less, 5.37 or less, 4.99 or less, 4.61 or less, or 4.23 or less in the order of the numerical values of the $CD_{nominal}$ as listed above, and $MFD/\lambda_{cc}$ is more preferably 6.92 or less, 6.54 or less, 6.16 or less, 5.78 or less, 5.40 or less, 5.02 or less, 4.64 or less, 4.25 or less, 3.87 or less, or 3.49 or less in the order of the numerical values of the $CD_{nominal}$ as listed above.

In order to set the leakage loss to the coating at the wavelength of 1550 nm to 0.01 dB/km or less and to set the parallel propagation XT after the propagation for 10 km to −40 dB or less, $MFD/\lambda_{cc}$ is preferably 6.93 or less, 6.58 or less, 6.24 or less, 5.89 or less, 5.55 or less, 5.20 or less, 4.86 or less, 4.51 or less, 4.17 or less, or 3.82 or less in the order of the numerical values of the $CD_{nominal}$ as listed above, and MFD/A, is more preferably 6.23 or less, 5.89 or less, 5.54 or less, 5.20 or less, 4.85 or less, 4.51 or less, 4.16 or less, 3.81 or less, 3.47 or less, or 3.12 or less in the order of the numerical values of the $CD_{nominal}$ as listed above.

$\lambda_{cc}$ is preferably 1260 nm or less, because a single mode operation on the O-band can be ensured. In this situation, by setting $MFD/\lambda_{cc}$ to 6.5 or more, $\lambda_{cc}$ can be set to 1260 nm or less, even in a case where the MFD falls within a range of 8.2 μm or more and 9.0 μm or less with 8.6 μm used as a basis. By setting MFD/2 to 7.2 or more, a larger MFD can be achieved, the splice loss between the MCFs can be reduced, and $\lambda_{cc}$ can be sufficiently smaller than 1260 nm ($\lambda_{cc}$ is 1.2 μm or less) (that is, a margin can be taken). In this case, for example, MFD falls within a range of 8.8 μm or more and 9.6 μm or less with 9.2 μm used as a basis, and $\lambda_{cc} \leq 1.23$ μm and $MFD/\lambda_{cc} \geq 7.2$ are satisfied. In these cases, $MFD/\lambda_{cc}$ preferably takes a value between an upper limit defined from $CD_{nominal}$ described above and a lower limit defined from a range of MFD and $\lambda_{cc}$.

In consideration of mass production of the MCFs, it is sufficient if the MCF has a structure in which the tolerance of $MFD/\lambda_{cc}$ is 1.0 or more, preferably 1.5 or more, more preferably 2.0 or more, and further preferably 2.5 or more. Most preferably, the MCF has a structure in which the tolerance of $MFD/\lambda_{cc}$ is 3.0 or more.

The MCF preferably has a structure that allows $MFD/\lambda_{cc}$ to be 6.5 or more and 7.5 or less. Furthermore, the MCF preferably has a structure that allows $MFD/\lambda_{cc}$ to be 6.5 or more and 8.0 or less, more preferably has a structure that allows 6.5 or more and 8.5 or less, and further preferably has a structure that allows 6.5 or more and 9.0 or less. The MCF most preferably has a structure that allows $MFD/\lambda_{cc}$ to be 6.5 or more and 9.5 or less.

The MCF may have a structure that allows 7.2 or more and 8.2 or less of $MFD/\lambda_{cc}$. Furthermore, the MCF preferably has a structure that allows $MFD/\lambda_{cc}$ to be 7.2 or more and 8.7 or less, more preferably has a structure that allows 7.2 or more and 9.2 or less, and further preferably has a structure that allows 7.2 or more and 9.7 or less. The MCF most preferably has a structure that allows $MFD/\lambda_{cc}$ to be 7.2 or more and 10.2 or less.

In a case where $\lambda_{cc}$ is more than 1260 nm and 1360 nm or less, in the configuration of FIG. 12 (a fiber that is not formed into a cable) of ITU-T G.650.1 (March/2018), 20 in out of 22 in in a sample fiber is bent with a bending radius of 140 mm or more, one spool of bending with a radius of 40 mm is added before and after the above 20 in segment, and $P_h$ represents an intensity of the higher-order mode and $P_f$ represents an intensity of the fundamental mode, when all modes are uniformly excited, a wavelength at which $10 \log_{10}[P_h/(P_f+P_h)]=0.1$ dB is satisfied is measured as $\lambda_{cc}$. However, in the MCF according to the present disclosure, a cutoff wavelength ($\lambda_{cc}R$) is preferably 1260 nm or less, when measured by bending the segment of 20 in out of 22 in in the sample fiber with a radius of 60 mm or more and 100 mm or less that has been changed. Accordingly, the single mode operation on the O-band after cable installation can be ensured. In addition, the length $L_{sample}$ [m] of the sample fiber falls within a range of more than 22 in and 1000 in or less, $L_{sample}-2$ [m] is bent with a bending radius of 140 mm or more, and one spool of bending with a radius of 40 mm is added before and after the above $L_{sample}-2$ [m] segment. The cutoff wavelength ($\lambda_{cc}L$) that has been measured is preferably 1260 nm or less. Accordingly, in the cable having a cable length $L_{sample}$ [m], the single mode operation on the O-band can be ensured.

In each core of the MCF according to the present disclosure, a bending loss at the wavelength of 1310 nm or more and 1360 nm or less is preferably 0.15 dB/turn or less at a bending radius of 10 mm, and is more preferably 0.02 dB/turn or less. Accordingly, also in a case where the MCF according to the present disclosure is formed in an ultra-high density cable of the intermittent-bonding ribbon type, an increase in loss after being formed into a cable can be suppressed.

In a case where an MCF cable that incorporates the MCF according to the present disclosure is linearly extended (at least a bending radius of 1 in or more), an average bending radius of the MCF formed into the cable is preferably 0.14 in or less, and more preferably 0.10 in or less. In addition, regarding the MCF cable incorporating the MCF according to the present disclosure, an average bending radius of the MCF formed into the cable is preferably 0.14 in or more and 0.3 in or less. Accordingly, the XT can be reduced.

Further, regarding the MCF cable incorporating the MCF according to the present disclosure, the average bending radius of the MCF formed into the cable is preferably 0.03 in or more, and more preferably 0.06 in or more. Accordingly, a loss caused by bending can be reduced.

Furthermore, the MCF cable incorporating the MCF according to the present disclosure is preferably an intermittent-bonding ribbon cable. Accordingly, the intermittent-bonding ribbon that is flexible can be formed into the cable while being spirally twisted, and the MCF can be formed into a cable with a small bending radius, so that the XT can be reduced.

The MCF cable incorporating the MCF according to the present disclosure is preferably a ribbon slot type cable, and preferably includes a tension member at the center of the slot member. Accordingly, the bending radius of the MCF becomes easily controllable, and the XT can be reduced. In addition, the provision of the tension member at the center of the slot member enables the cable to be easily bent in any direction, and the cable laying work can be easily performed.

Regarding the MCF cable incorporating the MCF according to the present disclosure, a tension member is preferably provided inside a sheath without the provision of a slot member in a space inside the sheath. Accordingly, the space inside the sheath can be effectively used, and the number of cores per cross-sectional area of the MCF cable can be increased.

As described heretofore, according to the MCFs according to the present disclosure, sufficient manufacturing tolerance is ensured, mass productivity is excellent, and degradation of splice loss can be suppressed.

What is claimed is:

1. A multi-core optical fiber comprising:
   four cores extending along a central axis; and
   a common cladding covering each of the four cores, wherein
   the four cores each have an adjacent relationship with two cores of remaining cores,
   a center-to-center interval A between the cores having the adjacent relationship among the four cores falls within a range of a value of $\Lambda_{nominal}-0.9$ μm or more and a value of $\Lambda_{nominal}+0.9$ μm or less with a predetermined core-interval nominal value $\Lambda_{nominal}$ used as a basis,
   on a cross-section of the four cores, the four cores are respectively allocated to four vertexes of a 3-sides equal trapezoid, in which three sides of the 3-sides equal trapezoid have an equal length of $\Lambda_{nominal}$, and a length of $\Lambda_{nominal}$ of the remaining one side of the 3-sides equal trapezoid is longer than the equal length of $\Lambda_{nominal}$ of the three sides of the 3-sides equal trapezoid,
   an outer diameter of the common cladding falls within a range of 124 μm or more and 126 μm or less with 125 μm used as a basis,
   in each of the four cores, a mode field diameter MFD at a wavelength of 1310 nm, a cable cutoff wavelength $\lambda_{cc}$ measured on a 22 m length of fiber, and a shortest distance $d_{coat}$ of distances from centers of the four cores to an outer periphery of the common cladding satisfy a relationship in a following Formula (1), in any of the four cores:

a numerical value of the shortest distance $d_{coat} \geq$ a numerical value of $(2.88 MFD/\lambda_{cc}+5.36)$ (1), in each of the four cores, the mode field diameter MFD falls within a range of a value of an MFD reference value−0.4 μm or more and a value of the MFD reference value+0.4 μm or less, with a value of 8.6 μm or more and 9.2 μm or less used as the MFD reference value,
   in each of the four cores, a zero-dispersion wavelength falls within a range of a value of a wavelength reference value−12 nm or more and a value of the wavelength reference value+12 nm or less with a value of 1312 nm or more and 1340 nm or less used as the wavelength reference value,
   in each of the four cores, a dispersion slope at the zero-dispersion wavelength is 0.092 ps/(nm²·km) or less,
   in each of the four cores, the cable cutoff wavelength $\lambda_{cc}$ is 1260 nm or less,
   either a first condition or a second condition is satisfied and either a third condition or a fourth condition is satisfied,
   the first condition is defined that each of the four cores is in direct contact with the common cladding,
   the second condition relates to each of the four cores, each of the four cores further including an optical cladding provided between each of the four cores and the common cladding, and is defined that a relative refractive index difference Δ2 of the optical cladding with respect to the common cladding satisfies a relationship that −0.1%≤Δ2≤0.1%,
   the third condition is defined that a crosstalk between the cores having the adjacent relationship for a fiber length of 10 km at a wavelength of 1360 nm is −10 dB or less, and in each of the four cores, MFD/$\lambda_{cc}$ and a center-to-center interval $\Lambda_a$ between the cores having the adjacent relationship satisfy a following Formula (2):

7.2≤a numerical value of $(MFD/\lambda_{cc})$≤10.2≤a numerical value of $(0.443\Lambda_a-5.33)$ (2), and the fourth condition is defined that the crosstalk between the cores having the adjacent relationship for the fiber length of 10 km at the wavelength of 1360 nm is −20 dB or less, and in each of the four cores, MFD/$\lambda_{cc}$ and the center-to-center interval $\Lambda_a$ between the cores having the adjacent relationship satisfy a following Formula (3):

7.2≤the numerical value of $(MFD/\lambda_{cc})$≤10.2≤a numerical value of $(0.392\Lambda_a-4.88)$ (3).

2. The multi-core optical fiber according to claim 1, further comprising
   a coating surrounding the common cladding, wherein
   a leakage loss from at least any of the four cores to the coating at a wavelength of 1550 nm or a wavelength of 1625 nm is 0.05 dB/km or more, a transmission loss of at least one of the four cores at the wavelength of 1550 nm is 0.25 dB/km or more, or a transmission loss at the wavelength of 1625 nm is 0.25 dB/km or more.

3. The multi-core optical fiber according to claim 1, wherein
   the third condition is satisfied, and
   the crosstalk between the cores having the adjacent relationship at a wavelength of 1550 nm for the fiber length of 10 km is −10 dB or more.

4. The multi-core optical fiber according to claim 1, wherein
the fourth condition is satisfied, and
the crosstalk between the cores having the adjacent relationship at a wavelength of 1550 nm for the fiber length of 10 km is −20 dB or more.

5. A multi-core optical fiber cable comprising a plurality of multi-core optical fibers including the multi-core optical fiber defined in claim 1.

6. The multi-core optical fiber cable according to claim 5, wherein the multi-core optical fiber has an average bending radius of 0.03 m or more and 0.14 m or less, or 0.14 m or more and 0.3 m or less in a fiber longitudinal direction.

7. A multi-core optical fiber cable incorporating a multi-core optical fiber ribbon in which a plurality of multi-core optical fibers including the multi-core optical fiber defined in claim 1 are intermittently bonded.

8. The multi-core optical fiber cable according to claim 7, wherein the multi-core optical fiber ribbon is incorporated with spirally twisted.

9. The multi-core optical fiber cable according to claim 7, wherein the multi-core optical fiber has an average bending radius of 0.03 m or more and 0.14 m or less, or 0.14 m or more and 0.3 m or less in a fiber longitudinal direction.

10. A multi-core optical fiber comprising:
four cores extending along a central axis; and
a common cladding covering each of the four cores, wherein
the four cores each have an adjacent relationship with two cores of remaining cores,
a center-to-center interval A between the cores having the adjacent relationship among the four cores falls within a range of a value of $\Lambda_{nominal}-0.9$ μm or more and a value of $\Lambda_{nominal}+0.9$ μm or less with a predetermined core-interval nominal value $\Lambda_{nominal}$ used as a basis,
on a cross-section of the four cores, the four cores are respectively allocated to four vertexes of a 3-sides equal trapezoid, in which three sides of the 3-sides equal trapezoid have an equal length of $\Lambda_{nominal}$, and a length of $\Lambda_{nominal}$ of the remaining one side of the 3-sides equal trapezoid is longer than the equal length of $\Lambda_{nominal}$ of the three sides of the 3-sides equal trapezoid,
a diameter CD of the common cladding falls within a range of a value of $CD_{nominal}-1$ μm or more and a value of $CD_{nominal}+1$ μm or less with a predetermined cladding diameter nominal value $CD_{nominal}$ [μm] of less than 125 μm used as a basis,
in each of the four cores, a mode field diameter MFD at a wavelength of 1310 nm, a cable cutoff wavelength $\lambda_{cc}$ measured on a 22 m length of fiber, and a shortest distance $d_{coat}$ of distances from centers of the four cores to an outer periphery of the common cladding satisfy a following Formula (4), in any of the four cores:

$$\text{a numerical value of the shortest distance } d_{coat} \geq \text{a numerical value of } (2.88\text{MFD}/\lambda_{cc}+5.36) \quad (4),$$

in each of the four cores, the mode field diameter MFD falls within a range of a value of an MFD reference value−0.4 μm or more and a value of the MFD reference value+0.4 μm or less with a value of 8.6 μm or more and 9.2 μm or less used as the MFD reference value,
in each of the four cores, a zero-dispersion wavelength falls within a range of a value a wavelength reference value−12 nm or more and a value of the wavelength reference value+12 nm or less with a value of 1312 nm or more and 1340 nm or less used as the wavelength reference value,
in each of the four cores, a dispersion slope at the zero-dispersion wavelength is 0.092 ps/(nm²·km) or less,
in each of the four cores, the cable cutoff wavelength $\lambda_{cc}$ is 1260 nm or less,
either a first condition or a second condition is satisfied and either a fifth condition or a sixth condition is satisfied,
the first condition is defined that each of the four cores is in direct contact with the common cladding,
the second condition relates to each of the four cores, each of the four cores further including an optical cladding provided between each of the four cores and the common cladding, and is defined that a relative refractive index difference Δ2 of the optical cladding with respect to the common cladding satisfies a relationship that −0.1%≤Δ2≤0.1%,
the fifth condition is defined that a crosstalk between the cores having the adjacent relationship for a fiber length of 10 km at a wavelength of 1360 nm is −10 dB or less, in each of the four cores, a following Formula (5):

$$\text{a numerical value of the predetermined cladding diameter nominal value } CD_{nominal} \geq \text{a numerical value of } (13.31\text{MFD}/\lambda_{cc}+24.47) \quad (5)$$

is satisfied,
and in each of the four cores, MFD/$\lambda_{cc}$ and a center-to-center interval $\Lambda_a$ between the cores having the adjacent relationship satisfy a following Formula (6):

$$6.5 \leq \text{a numerical value of } (\text{MFD}/\lambda_{cc}) \leq 9.5 \leq \text{a numerical value of } (0.443\Lambda_a-5.33) \quad (6), \text{ and}$$

the sixth condition is defined that the crosstalk between the cores having the adjacent relationship for the fiber length of 10 km at the wavelength of 1360 nm is −20 dB or less, in each of the four cores, a following Formula (7):

$$\text{the numerical value of the predetermined cladding diameter nominal value } CD_{nominal} \geq \text{a numerical value of } (9.37\text{MFD}/\lambda_{cc}+31.73) \quad (7)$$

is satisfied,
and in each of the four cores, MFD/$\lambda_{cc}$ and the center-to-center interval $\Lambda_a$ between the cores having the adjacent relationship satisfy a following Formula (8):

$$6.5 \leq \text{the numerical value of } (\text{MFD}/\lambda_{cc}) \leq 9.5 \leq \text{a numerical value of } (0.392\Lambda_a-4.88) \quad (8).$$

11. The multi-core optical fiber according to claim 10, further comprising
a coating surrounding the common cladding, wherein
a leakage loss from at least any of the four cores to the coating at a wavelength of 1550 nm or a wavelength of 1625 nm is 0.05 dB/km or more, a transmission loss of at least one of the four cores at the wavelength of 1550 nm is 0.25 dB/km or more, or a transmission loss at the wavelength of 1625 nm is 0.25 dB/km or more.

12. The multi-core optical fiber according to claim 10, wherein
the fifth condition is satisfied, and
the crosstalk between the cores having the adjacent relationship at a wavelength of 1550 nm for the fiber length of 10 km is −10 dB or more.

13. The multi-core optical fiber according to claim 10, wherein
the sixth condition is satisfied, and
the crosstalk between the cores having the adjacent relationship at a wavelength of 1550 nm for the fiber length of 10 km is −20 dB or more.

14. A multi-core optical fiber cable comprising a plurality of multi-core optical fibers including the multi-core optical fiber defined in claim 10.

15. The multi-core optical fiber cable according to claim 14, wherein the multi-core optical fiber has an average bending radius of 0.03 m or more and 0.14 m or less, or 0.14 m or more and 0.3 m or less in a fiber longitudinal direction.

16. A multi-core optical fiber cable incorporating a multi-core optical fiber ribbon in which a plurality of multi-core optical fibers including the multi-core optical fiber defined in claim 10 are intermittently bonded.

17. The multi-core optical fiber cable according to claim 16, wherein the multi-core optical fiber ribbon is incorporated with spirally twisted.

18. The multi-core optical fiber cable according to claim 16, wherein the multi-core optical fiber has an average bending radius of 0.03 m or more and 0.14 m or less, or 0.14 m or more and 0.3 m or less in a fiber longitudinal direction.

* * * * *